US010898923B2

(12) United States Patent
Itoh et al.

(10) Patent No.: US 10,898,923 B2
(45) Date of Patent: Jan. 26, 2021

(54) BRIGHT PIGMENT DISPERSION AND METHOD FOR FORMING MULTILAYER COATING FILM

(71) Applicant: KANSAI PAINT CO., LTD., Hyogo (JP)

(72) Inventors: Masayuki Itoh, Aichi (JP); Nobuhiko Narita, Kanagawa (JP); Tatsuo Kuramochi, Kanagawa (JP); Hisashi Isaka, Kanagawa (JP); Hirokazu Okazaki, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 206 days.

(21) Appl. No.: 16/090,696

(22) PCT Filed: Feb. 6, 2017

(86) PCT No.: PCT/JP2017/004279
§ 371 (c)(1),
(2) Date: Oct. 2, 2018

(87) PCT Pub. No.: WO2017/175468
PCT Pub. Date: Oct. 12, 2017

(65) Prior Publication Data
US 2020/0238333 A1 Jul. 30, 2020

(30) Foreign Application Priority Data

Apr. 4, 2016 (JP) ................. 2016-075457
Oct. 7, 2016 (JP) ................. 2016-199413

(51) Int. Cl.
B05D 5/06 (2006.01)
C09D 7/61 (2018.01)
C09D 7/65 (2018.01)
C09D 7/40 (2018.01)
B05D 7/00 (2006.01)
C09D 17/00 (2006.01)

(52) U.S. Cl.
CPC ............ B05D 5/061 (2013.01); B05D 7/57 (2013.01); C09D 7/61 (2018.01); C09D 7/65 (2018.01); C09D 7/70 (2018.01); C09D 17/001 (2013.01)

(58) Field of Classification Search
None
See application file for complete search history.

(56) References Cited

U.S. PATENT DOCUMENTS

| 6,335,057 | B1 | 1/2002 | Noura et al. | |
|---|---|---|---|---|
| 2003/0139512 | A1* | 7/2003 | Wegner | G09D 175/00 524/445 |
| 2005/0176880 | A1 | 8/2005 | Fujii et al. | |
| 2006/0047018 | A1 | 3/2006 | Li et al. | |
| 2009/0035476 | A1 | 2/2009 | Uemura et al. | |
| 2017/0051150 | A1* | 2/2017 | Kawaharada | C08G 18/755 |

FOREIGN PATENT DOCUMENTS

| EP | 3 542 909 | 9/2019 |
|---|---|---|
| JP | 63-272544 | 11/1988 |
| JP | 11-90318 | 4/1999 |
| JP | 2003-313500 | 11/2003 |
| JP | 2005-120249 | 5/2005 |
| JP | 2005-220284 | 8/2005 |
| JP | 2005-264144 | 9/2005 |
| JP | 2006-95522 | 4/2006 |
| JP | 2009-28690 | 2/2009 |
| JP | 2009-28693 | 2/2009 |
| JP | 2009-155537 | 7/2009 |
| JP | 2011-508030 | 3/2011 |
| JP | 2015-187247 | 10/2015 |
| WO | 2009/083176 | 7/2009 |

OTHER PUBLICATIONS

International Search Report dated Mar. 7, 2017 in International (PCT) Application No. PCT/JP2017/004279.
Extended European Search Report dated Jan. 28, 2020 in corresponding European Patent Application No. 17778847.8.

* cited by examiner

Primary Examiner — Sheeba Ahmed
(74) Attorney, Agent, or Firm — Wenderoth, Lind & Ponack, L.L.P.

(57) ABSTRACT

The present invention relates to an effect pigment dispersion comprising water, a flake aluminum pigment, and a cellulose-based rheology control agent, wherein the effect pigment dispersion contains 0.1 to 10 parts by mass of solids based on 100 parts by mass of all components thereof, the viscosity measured using a Brookfield type viscometer is 400 to 10000 mPa·sec at a rotational speed of 6 revolutions per minute, and the solids content of the flake aluminum pigment is 30 to 200 parts by mass based on 100 parts by mass of the total amount of components other than the flake aluminum pigment in the total solids content.

11 Claims, No Drawings

US 10,898,923 B2

BRIGHT PIGMENT DISPERSION AND METHOD FOR FORMING MULTILAYER COATING FILM

TECHNICAL FIELD

The present invention relates to an effect pigment dispersion and a method for forming a multilayer coating film.

BACKGROUND ART

The purpose of applying coating compositions is mainly to protect materials and impart an excellent appearance. For industrial products, excellent appearance, particularly "texture," is important in terms of enhancing their product power. Although there are various textures for industrial products desired by consumers, luster like metal or pearl (hereinafter referred to as "metallic luster") has recently been desired in the field of automobile exterior panels, automobile components, home electronics, and the like.

Metallic luster is a texture characterized in that the surface has no graininess, like a mirror-finished surface, in that the coated plate looks shiny when viewed nearly perpendicular to the coated plate (highlight), and in that, conversely, the coated plate looks dark when viewed obliquely to the coated plate (bottom). That is, there is a large luminance difference between the highlight region and the bottom region.

Techniques to impart metallic luster to the surface of industrial products include metal plating treatment, metal deposition treatment (e.g., PTL 1), and the like. Metallic luster imparted by coating would be advantageous in terms of ease, cost, and the like.

PTL 2 discloses a method for forming a metallic coating film, the method comprising applying a composition comprising non-leafing aluminum flakes and an organic solvent to an uncured coating surface, and then applying a clear paint.

Further, PTL 3 discloses a metallic coating composition prepared by diluting a metallic coating material base containing an effect material, a resin-containing non-volatile solid, and a solvent with a diluent comprising a high-boiling solvent and a low-boiling solvent at a dilution rate of 150 to 500%, and adding 5 to 10 parts by weight of viscous resin based on 100 parts by weight of the resin content in the metallic coating material base.

PTL 4 discloses a metallic coating composition prepared by diluting a coating material base comprising, on a solid basis, 10 to 30% of an effect material, 10 to 50% of a cellulose acetate butyrate resin having a molecular weight of 25,000 to 50,000 (MWn), and an acrylic melamine resin as a balance, with an ester-based solvent and/or a ketone-based solvent at a dilution rate in which the solids content is 1 to 10 wt. %.

PTL 5 discloses a method for forming a multilayer coating film, the method using an effect material-containing base coating composition comprising colloidal particles containing precious metal and/or metal, a coating film-forming resin, and a specific mixed solvent.

PTL 6 discloses a method for forming a multilayer coating film, the method using a specific effect material-containing base coating composition comprising a coating film-forming resin and colloidal particles containing precious metal and/or metal, in combination with a specific coating method.

The coating compositions disclosed in PTL 2 to PTL 6 are solvent-based coating compositions. However, in terms of low environmental impact, aqueous coating compositions have recently been required in the field of metallic coating compositions.

PTL 7 discloses an aqueous base coating composition comprising an effect pigment composed of metal flakes obtained by crushing a vapor-deposition metal film, and an aqueous cellulose derivative having an acid value of 20 to 150 mgKOH/g (solids content), wherein the aqueous cellulose derivative serves as a main binder resin, and the content of the effect pigment is 20 to 70 mass % as PWC.

However, a coating film formed from the coating composition disclosed in PTL 7 had insufficient metallic luster. Further, there was a cost problem because the use of a binder resin was essential.

Moreover, PTL 8 discloses a method for coating an aqueous base coating composition comprising a flake-effect pigment, the method comprising applying an aqueous base coating composition (A1) adjusted to have a solids content of 20 to 40 wt. % in the coating composition to a substrate so that the dry film thickness is 1 to 15 μm, and then applying an aqueous base coating composition (A2) adjusted to have a solids content of 2 to 15 wt. % in the coating composition to the uncured coating film so that the dry film thickness is 0.1 to 5 μm.

However, due to the recent demand for metallic luster like a mirror-finished surface in which the 60° specular gloss is 100 or more, coating films formed by the coating method disclosed in PTL 8 had insufficient metallic luster.

CITATION LIST

Patent Literature

PTL 1: JPS63-272544A
PTL 2: JPH11-90318A
PTL 3: JP2003-313500A
PTL 4: JP2005-120249A
PTL 5: JP2009-28690A
PTL 6: JP2009-28693A
PTL 7: JP2009-155537A
PTL 8: JP2006-95522A

SUMMARY OF INVENTION

Technical Problem

An object of the present invention is to provide an effect pigment dispersion that can form a dense metallic coating film having high glossiness in the highlight and low graininess, and to also provide a method for forming a multilayer coating film.

Solution to Problem

One embodiment of the present invention provides an effect pigment dispersion comprising water, a flake aluminum pigment, and a cellulose-based rheology control agent,
wherein the effect pigment dispersion contains 0.1 to 10 parts by mass of solids based on 100 parts by mass of all components thereof,
the viscosity measured using a Brookfield type viscometer is 400 to 10000 mPa·sec at a rotational speed of 6 revolutions per minute, and
the solids content of the flake aluminum pigment is 30 to 200 parts by mass based on 100 parts by mass of the total amount of components other than the flake aluminum pigment in the total solids content.

Advantageous Effects of Invention

The present invention can provide an effect pigment dispersion that can form a dense metallic coating film having high glossiness in the highlight and low graininess, and also provide a method for forming a multilayer coating film.

DESCRIPTION OF EMBODIMENTS

The present invention relates to an effect pigment dispersion comprising water, a specific amount of flake aluminum pigment, and a cellulose-based rheology control agent; a method for forming a multilayer coating film, the method comprising applying the effect pigment to a colored coating film formed from a colored coating composition, and further applying a clear paint to the effect pigment; and a multilayer coating film comprising the effect pigment. First, the effect pigment dispersion is explained in detail below.

Effect Pigment Dispersion

The effect pigment dispersion comprises water, a flake aluminum pigment, and a cellulose-based rheology control agent.

Flake Aluminum Pigment

The flake aluminum pigment may be a milling-type flake aluminum pigment generally produced by grinding or milling aluminum in a ball mill or an attritor mill in the presence of a grinding liquid medium using a grinding aid, or may be a vapor-deposition flake aluminum pigment described later. Grinding aids used in the production process of milling-type flake aluminum pigments include higher fatty acids, such as oleic acid, stearic acid, isostearic acid, lauric acid, palmitic acid, and myristic acid; as well as aliphatic amine, aliphatic amide, and aliphatic alcohol. As the grinding liquid medium, an aliphatic hydrocarbon, such as mineral spirit, is used.

Flake aluminum pigments are roughly categorized into leafing-type and non-leafing type flake aluminum pigments, according to the type of grinding aid. When a leafing-type flake aluminum pigment is incorporated in a coating composition, the aluminum particles align themselves (leafing) on the surface of a coating film obtained by application of this coating composition, providing a finished appearance with strong metallic texture. This coating film has a heat reflection effect and rust resistance, and is thus often used for plant equipment, such as tanks, ducts, pipes, and roofing materials; and various building materials. It is possible to use a leafing-type flake aluminum pigment as the flake aluminum pigment used in the effect pigment dispersion of the present invention. When this type of flake aluminum pigment is used, however, care must be taken regarding the adhesion to the upper clear coating film, because the aluminum particles align themselves on the coating film surface due to the surface tension effect of the grinding aid during the coating film formation process. However, this depends on the amount of the flake aluminum pigment. Considering this point, it is preferable to use a non-leafing type flake aluminum pigment.

Although non-leafing type flake aluminum pigments whose surfaces are not treated can be used, those having resin-coated surfaces, those having silica-treated surfaces, and those having surfaces treated with phosphoric acid, molybdic acid, or a silane coupling agent can also be used. Among these various surface treatments, one treatment can be used, and several types of treatments may be combined.

In addition, colored aluminum pigments may also be used, such as flake aluminum pigments whose surfaces are coated with a color pigment, and further coated with resin; and flake aluminum pigments whose surfaces are coated with metal oxide, such as iron oxide.

The flake aluminum pigment has an average particle size of preferably 1 to 100 µm, from the viewpoint of the finished appearance, the lightness in the highlight, and the lightness change from the highlight to the bottom of the resulting coating film. The average particle size is more preferably 5 to 50 µm, and particularly preferably 7 to 30 µm. The thickness is preferably 0.01 to 1.0 µm, and particularly preferably 0.02 to 0.5 µm. The average particle size as used herein refers to a median diameter of volume-based particle size distribution measured by a laser diffraction scattering method using a Microtrac particle size distribution analyzer MT3300 (trade name, produced by Nikkiso Co., Ltd.). The thickness is defined as an average value of 100 or more measured values obtained by observing the cross-section of a coating film comprising the flake aluminum pigment by using a microscope, and measuring the thickness by using image-processing software.

If the average particle size exceeds the upper limit of the above range, it is possible that the obtained multilayer coating film will undesirably have graininess due to the flake aluminum pigment. If the average particle size is smaller than the lower limit, it is possible for the lightness change from the highlight to the bottom to be too small.

As the flake aluminum pigment in the effect pigment dispersion of the present invention, a vapor-deposition flake aluminum pigment is preferably used in terms of increasing the lightness in the highlight of the coating film obtained by coating. The vapor-deposition flake aluminum pigment can be obtained by vapor-depositing an aluminum film on a base substrate, removing the base substrate, and then grinding the vapor-deposited aluminum film. As the substrate, a film can be used, for example.

As the vapor-deposition flake aluminum pigment, those formed from a single vapor-deposition aluminum film can be used. However, multilayered pigments in which other metal or metal oxide is further formed in addition to a vapor-deposition aluminum film may also be used.

Examples of commercial products of the vapor-deposition flake aluminum pigment include "METALURE" series (trade name, produced by Eckart), "Hydroshine" series (trade name, produced by Eckart), "Decomet" series (trade name, produced by Schlenk), "Metasheen" series (trade name, produced by BASF A.G.), and the like.

When a vapor-deposition flake aluminum pigment is used, the average thickness thereof is 0.01 to 0.2 µm, and preferably 0.02 to 0.1 µm. Moreover, in terms of the stability in the coating composition, and the finish of the resulting coating film, the average particle size (D50) is 1 to 50 µm, and preferably 5 to 25 µm.

As the vapor-deposition flake aluminum pigment, those that have been subjected to various surface treatments can also be used. However, in terms of the storage stability of the effect pigment dispersion, a silica-treated pigment is particularly preferably used.

The content of the flake aluminum pigment in the effect pigment dispersion of the present invention is preferably 0.1 to 7 mass %, more preferably 0.1 to 5 mass %, and even more preferably 0.2 to 5 mass %, based on the total mass of the effect pigment dispersion, in terms of obtaining a coating film with excellent metallic luster. Furthermore, when the flake aluminum pigment has a thickness of 0.01 to 0.2 µm, the content of the flake aluminum pigment in the effect pigment dispersion is preferably 0.1 to 1 mass %, and particularly preferably 0.2 to 0.7 mass %.

Of the total solids content of the effect pigment dispersion of the present invention, the content of the flake aluminum pigment, as solids content, is preferably 30 to 200 parts by mass based on 100 parts by mass of the total amount of the components other than the flake aluminum pigment, in terms of obtaining a coating film with excellent metallic luster. The content of the flake aluminum pigment, as solids content, is more preferably 32 to 150 parts by mass, and even more preferably 35 to 100 parts by mass.

Cellulose-Based Rheology Control Agent

Examples of the cellulose-based rheology control agent in the effect pigment dispersion include carboxymethylcellulose, methylcellulose, hydroxyethylcellulose, hydroxyethylmethylcellulose, hydroxypropylmethylcellulose, cellulose nanofibers, cellulose nanocrystals, and the like. Of these, cellulose nanofibers are preferably used in terms of obtaining a coating film with excellent metallic luster.

The cellulose nanofibers mentioned above are also referred to as cellulose nanofibrils, fibrillated cellulose, or nanocellulose crystals.

The number average fiber diameter of the cellulose nanofibers is preferably 2 to 500 nm, more preferably 2 to 250 nm, and even more preferably 2 to 150 nm, in terms of obtaining a coating film with excellent metallic luster. Moreover, the number average fiber length is preferably 0.1 to 20 μm, more preferably 0.1 to 15 μm, and even more preferably 0.1 to 10 μm. The aspect ratio, which is a numerical value obtained by dividing the number average fiber length by the number average fiber diameter, is preferably 50 to 10000, more preferably 50 to 5000, and even more preferably 50 to 1000.

The above number average fiber diameter and number average fiber length are measured and calculated from an image observed with a transmission electron microscope (TEM), the image being obtained by, for example, dispersing a sample obtained by diluting cellulose nanofibers in water, and casting the resultant on a carbon film-coated grid that has been subjected to hydrophilization treatment.

As the cellulose nanofibers, those obtained by defibrating a cellulose raw material, and stabilizing the resultant in water can be used.

Moreover, a water dispersion obtained by modifying a cellulose raw material with anion using a known method, subjecting the resultant to various treatments, and dispersing it in an aqueous solvent can be used. For example, cellulose nanofibers obtained by introducing a group, such as a carboxyl or carboxymethyl group, into a cellulose raw material by a known method, washing the obtained modified cellulose to prepare a dispersion of the modified cellulose, and applying mechanical shear force to the dispersion for defibration can be used.

Examples of commercial products of the cellulose nanofibers include Rheocrysta (registered trademark, produced by Dai-Ichi Kogyo Seiyaku Co., Ltd.) and the like. In the present invention, for example, cellulose nanofibers prepared in the following manner can be used.

The cellulose nanofibers can be produced, for example, in the following manner.

A group, such as a carboxyl or carboxymethyl group, is introduced into a cellulose raw material by a known method, the obtained modified cellulose is washed to prepare a dispersion of the modified cellulose, and mechanical shear force is applied to the dispersion for defibration.

The cellulose raw material used herein refer to materials in various forms mainly comprising cellulose. Specific examples include pulp (wood pulp, pulp derived from herbs, such as jute, Manila hemp, or kenaf, etc.), natural cellulose, such as cellulose produced by microorganisms; regenerated cellulose spun after cellulose is dissolved in a solvent, such as a cupramnonium solution or a morpholine derivative; fine cellulose obtained by subjecting the above cellulose raw material to mechanical treatment, such as hydrolysis, alkaline hydrolysis, enzymatic decomposition, blasting, or vibration ball mill, to thereby depolymerize cellulose; and the like.

The method for defibrating the above cellulose raw material is not particularly limited, as long as the cellulose raw material maintains a fibrous state. Examples include mechanical defibration treatment using a homogenizer, a grinder, or the like; chemical treatment using an oxidation catalyst or the like; and biological treatment using microorganisms or the like.

Moreover, as the cellulose nanofibers, anion-modified cellulose nanofibers can also be used. Examples of anion-modified cellulose nanofibers include carboxylated cellulose nanofibers, carboxymethylated cellulose nanofibers, etc. The anion-modified cellulose nanofibers can be obtained by, for example, introducing a functional group, such as a carboxyl or carboxymethyl group, into a cellulose raw material by a known method, washing the obtained modified cellulose to prepare a dispersion of the modified cellulose, and defibrating the dispersion. The above carboxylated cellulose is also called oxidized cellulose.

The oxidized cellulose can be obtained by, for example, oxidizing the cellulose raw material in water using an oxidant in the presence of a compound selected from the group consisting of an N-oxyl compound, bromide, iodide, and a mixture thereof.

The amount of N-oxyl compound used is not particularly limited, as long as it is a catalyst amount that can form cellulose into nanofibers. The amount of bromide or iodide used can be suitably selected within a range that can promote an oxidation reaction.

Known oxidants can be used, and examples include halogen, hypohalous acid, halous acid, perhalogen acid, and salts thereof, halogen oxide, peroxide, and the like. The amount of carboxyl group in the oxidized cellulose is preferably set to be 0.2 mmol/g or more based on the solids content mass of the oxidized cellulose. The amount of carboxyl group can be adjusted by controlling the oxidation reaction time, controlling the oxidation reaction temperature, controlling the pH during the oxidation reaction, or controlling the amount of N-oxyl compound, bromide, iodide, or oxidant.

A carboxymethyl group can be introduced in the following manner.

The above cellulose raw material and a solvent are mixed, and mercerization is performed at a reaction temperature of 0 to 70° C. for a reaction time of about 15 minutes to 8 hours using, as a mercerizing agent, 0.5 to 20 moles of hydroxylated alkali metal per glucose residue of the cellulose raw material. Thereafter, 0.05 to 10.0 moles of carboxymethylating agent per glucose residue is added, and reacted at a reaction temperature of 30 to 90° C. for a reaction time of 30 minutes to 10 hours, thereby introducing a carboxymethyl group into the hydroxyl group in the cellulose molecule.

The carboxymethyl substitution degree per glucose unit in the modified cellulose obtained by introducing a carboxymethyl group into the above cellulose raw material is preferably 0.02 to 0.50.

The modified cellulose obtained in the above manner can be defibrated using a grinder after it is formed into a dispersion in an aqueous solvent. As the grinder, a high-speed shear grinder, a collision grinder, a bead mill grinder, a high-speed rotating grinder, a colloid mill grinder, a high-pressure grinder, a roll mill grinder, or an ultrasonic grinder can be used. These can also be used in a combination of two or more. Of these, it is preferable to use a high-speed shear defibrating device, a collision defibrating device, or a high-speed rotating defibrating device, because stronger shear force can be treated under conditions where the risk of contamination by media is low.

Further, cellulose nanofibers or cellulose nanocrystals obtained by neutralizing the above oxidized cellulose with a basic neutralizer can also be suitably used as the cellulose-based rheology control agent. Neutralization using such a neutralizer improves the anti-water adhesion of cellulose-based rheology control agents, including cellulose nanofibers. The neutralizer for the oxidized cellulose in the present specification is a neutralizer of an organic base bulkier than inorganic metal salt groups, such as sodium hydroxide. Preferable examples of the neutralizer include organic bases, such as quaternary ammonium salts and amines (primary amine, secondary amine, and tertiary amine). Preferable quaternary ammonium salts are quaternary ammonium hydroxide. Examples of amines include alkylamines and alcoholamines. Examples of alkylamines include N-butylamine, N-octylamine, dibutylamine, triethylamine, and the like. Examples of alcoholamines include N-butyl ethanolamine, N-methyl ethanolamine, 2-amino-2-methyl-1-propanol, dimethylethanolamine, dibutylethanolamine, methyldiethanolamine, and the like.

The content of the neutralizer is not particularly limited, as long as a part or whole of the oxidized cellulose can be neutralized. However, the content of the neutralizer is preferably 0.2 to 1.0 equivalent, in terms of neutralization equivalent based on the contained acid group.

The content of the cellulose-based rheology control agent in the effect pigment dispersion of the present invention is preferably in the range of 2 to 150 parts by mass, more preferably 3 to 120 parts by mass, and particularly preferably 4 to 100 parts by mass, based on 100 parts by mass of the content of the flake-effect pigment, in terms of obtaining a coating film with excellent metallic luster.

Other Rheology Control Agents

In the effect pigment dispersion of the present invention, other rheology control agents can be used in combination, in addition to the cellulose-based rheology control agent, in terms of obtaining a coating film with excellent metallic luster. Examples of other rheology control agents include polyamide-based rheology control agents, mineral-based rheology control agents, polyacrylic acid-based rheology control agents, and the like.

Examples of polyamide-based rheology control agents include polyamide amine salts, fatty acid polyamide, and the like.

Examples of mineral-based rheology control agents include swelling laminar silicate that has a 2:1 type crystal structure. Specific examples include smectite group clay minerals, such as natural or synthetic montmorillonite, saponite, hectorite, stevensite, beidellite, nontronite, bentonite, and laponite; swelling mica group clay minerals, such as Na-type tetrasilicic fluorine mica, Li-type tetrasilicic fluorine mica, Na salt-type fluorine taeniolite, and Li-type fluorine taeniolite; and vermiculite; or substitution products and derivatives thereof, or mixtures thereof.

Examples of polyacrylic acid-based rheology control agents include sodium polyacrylate, polyacrylic acid-(meth) acrylic acid ester copolymers, and the like.

Examples of commercial products of the polyacrylic acid-based rheology control agent include "Primal ASE-60," "Primal TT615," and "Primal RM5" (trade names, produced by The Dow Chemical Company); "SN Thickener 613," "SN Thickener 618," "SN Thickener 630," "SN Thickener 634," and "SN Thickener 636" (trade names, produced by San Nopco Limited); and the like. The acid value of the solids content of the polyacrylic acid-based rheology control agent is 30 to 300 mgKOH/g, and preferably 80 to 280 mgKOH/g.

When Other Rheology Control Agents are Used, the content thereof is preferably in the range of 1 to 200 parts by mass, and more preferably 50 to 120 parts by mass, based on 100 parts by mass of the content of the cellulose-based rheology control agent.

Surface Adjusting Agent

The effect pigment dispersion of the present invention can contain a surface adjusting agent.

The surface adjusting agent is used to facilitate uniform orientation of the flake aluminum pigment dispersed in water on the substrate when the effect pigment dispersion is applied to the substrate.

Examples of the surface adjusting agent include silicone-based surface adjusting agents, acrylic-based surface adjusting agents, vinyl-based surface adjusting agents, and fluorine-based surface adjusting agents. These surface adjusting agents can be used singly or in a combination of two or more.

Examples of commercial products of the surface adjusting agent include BYK series (produced by BYK-Chemie), Tego series (produced by Evonik), Glanol series and Polyflow series (produced by Kyoeisha Chemical Co., Ltd.), DISPARLON series (produced by Kusumoto Chemicals, Ltd.), and the like.

The surface adjusting agent is preferably a silicone-based surface adjusting agent, in terms of the metallic luster, water resistance, and the like of the coating film to be obtained. Usable silicone-based surface adjusting agents include polydimethylsiloxane and modified silicone obtained by modifying polydimethylsiloxane. Examples of modified silicone include polyether-modified silicone, acrylic-modified silicone, polyester-modified silicone, and the like.

The surface adjusting agent preferably has a contact angle of 8 to 20°, preferably 9 to 19°, and more preferably 10 to 18°, with respect to a previously degreased tin plate (produced by Paltek Corporation), the contact angle being measured in such a manner that a liquid that is a mixture of isopropanol, water, and the surface adjusting agent at a ratio of 4.5/95/1 is adjusted to have a viscosity of 150 mPa·s measured by a Brookfield type viscometer at a rotor rotational speed of 60 revolutions per minute (60 rpm) at a temperature of 20° C., 10 µL of the liquid is added dropwise to the tin plate, and the contact angle with respect to the tin plate is measured 10 seconds after dropping. Specifically, the viscosity is controlled by adding Acrysol ASE-60 (trade name, a polyacrylic acid-based rheology control agent, produced by The Dow Chemical Company, solids content: 28%) and dimethylethanolamine.

The 4.5/95/1 ratio, which is the ratio of isopropanol/water/surface adjusting agent, corresponds to the component ratio of the effect pigment dispersion (Y) for evaluating the surface adjusting agent. The 150 mPa·s viscosity measured by a Brookfield type viscometer at a rotor rotational speed of 60 rpm is a normal value during coating to a substrate.

Moreover, the 8° to 20° contact angle with respect to the tin plate represents the wet spreading of liquid under standard coating conditions. When the contact angle is 8° or more, the liquid is applied to a substrate without being overly spread; whereas when the contact angle is 20° or less, the liquid is uniformly applied to a substrate without being overly repelled.

The dynamic surface tension of the surface adjusting agent is preferably 50 to 70 mN/m, more preferably 53 to 68 mN/m, and even more preferably 55 to 65 mN/m. In the present specification, the dynamic surface tension refers to a surface tension value measured by the maximum bubble pressure method at a frequency of 10 Hz. The dynamic surface tension is measured using a SITA measuring apparatus (SITA t60, produced by EKO Instruments).

Moreover, the static surface tension of the surface adjusting agent is preferably 15 to 30 mN/m, more preferably 18 to 27 mN/m, and even more preferably 20 to 24 mN/m. The static surface tension is measured using a surface tensiometer (DCAT 21, produced by EKO Instruments).

Furthermore, the lamellar length of the surface adjusting agent (A) is preferably 6.0 to 9.0 mm, more preferably 6.5 to 8.5 mm, and even more preferably 7.0 to 8.0 mm.

When the effect pigment dispersion of the present invention contains a surface adjusting agent, the content thereof is preferably in the range of 100 to 1000 parts by mass, and particularly preferably 180 to 600 parts by mass, based on 100 parts by mass of the content of the flake aluminum pigment, in terms of obtaining a coating film with excellent metallic luster.

Crosslinkable Component

The effect pigment dispersion of the present invention may further contain a crosslinkable component, in terms of the anti-water adhesion of the coating film to be obtained.

When the effect pigment dispersion contains a base resin mentioned above, the crosslinkable component is a component for crosslinking and curing the base resin by heating. When the effect pigment dispersion does not contain a base resin, the crosslinkable component may be a self-crosslinkable component, or may be a component for crosslinking and curing part of a colored coating composition for forming a colored coating film described later, or part of a clear paint for forming a clear coating film described later. Examples of the crosslinkable component include amino resins, urea resins, polyisocyanate compounds, blocked polyisocyanate compounds, polyisocyanate compounds blocked with active methylene compounds, epoxy-containing compounds, carboxy-containing compounds, carbodiimide group-containing compounds, hydrazide group-containing compounds, semicarbazide group-containing compounds, silane coupling agents, and the like. Preferable among these are amino resins reactive with a hydroxyl group, polyisocyanate compounds, blocked polyisocyanate compounds, and carbodiimide group-containing compounds reactive with a carboxyl group. Polyisocyanate compounds and blocked polyisocyanate compounds described later in the section "Clear Paint" can be used. The above crosslinkable components can be used singly or in a combination of two or more.

When the effect pigment dispersion contains a crosslinkable component, the content thereof as a solids content is preferably within the range of 1 to 100 parts by mass, more preferably 5 to 95 parts by mass, and even more preferably 10 to 90 parts by mass, based on 100 parts by mass of the solids content of the flake aluminum pigment in the effect pigment dispersion, in terms of the anti-water adhesion of the coating film.

When the effect pigment dispersion contains a binder resin, such as a base resin or a dispersion resin, described later, and further contains a crosslinkable component, the total amount as a solids content of the binder resin and the crosslinkable component is, in terms of forming a coating film with metallic luster, preferably within the range of 0.1 to 500 parts by mass, more preferably 1 to 300 parts by mass, and even more preferably 10 to 100 parts by mass, based on 100 parts by mass of the solids content of the flake aluminum pigment in the effect pigment dispersion, in terms of the anti-water adhesion of the coating film.

Other Components

The effect pigment dispersion may further suitably contain, if necessary, an organic solvent, a pigment other than the flake aluminum pigment, a pigment dispersant, an anti-settling agent, an antifoaming agent, an ultraviolet absorber, etc.

The effect pigment dispersion may contain a binder resin, such as a base resin or a dispersion resin, in terms of the adhesion and storage stability of the coating film to be obtained. However, the effects of the present invention can be exhibited, even if these resins are not substantially contained.

Examples of the base resin include acrylic resins, polyester resins, alkyd resins, urethane resins, and the like.

As the dispersion resin, existing dispersion resins, such as acrylic resins, epoxy resins, polycarboxylic acid resins, and polyester resins, can be used.

When the effect pigment dispersion contains a base resin or a dispersion resin, the total amount thereof is 0.01 to 500 parts by mass, preferably 5 to 300 parts by mass, and more preferably 10 to 200 parts by mass, based on 100 parts by mass of the amount of flake aluminum pigment.

Viscosity

In the effect pigment dispersion of the present specification, the amount and composition of the above components are determined so that the viscosity at a rotational speed of 6 revolutions per minute (6 rpm) is within the range of 400 to 10000 mPa·sec. Viscosity is defined as viscosity 1 minute after the start of measurement under constant conditions. Specifically, the prepared effect pigment dispersion is placed in a predetermined container, and mixed by stirring with a rotary stirrer, while setting the rotational speed to 1000 revolutions per minute, until it become homogeneous. Thereafter, the viscosity at 6 rpm is measured at a temperature of 20° C. using a B Brookfield type viscometer, and is defined as the viscosity 1 minute after the start of measurement (hereinafter also referred to as "B6 value" in the present specification). The viscometer used in this case is a Brookfield type viscometer (trade name: LVDV-I, produced by Brookfield). The rotational speed of 6 rpm is a general condition for controlling the viscosity of pseudoplastic fluid. If the viscosity of the effect pigment dispersion at 6 rpm is less than 400 mPa·sec, liquid sagging occurs during coating, the orientation of the flake aluminum pigment is disturbed, and a dense metallic coating film with low graininess cannot be obtained. If the viscosity of the effect pigment dispersion at 6 rpm exceeds 10000 mPa·sec, the viscosity is so high that uniform coating is difficult, and a dense metallic coating film with low graininess cannot be obtained.

When the solids content is adjusted to 0.5 mass, the viscosity of the effect pigment dispersion at a temperature of 20° C. measured by a Brookfield type viscometer at 60 revolutions per minute (60 rpm) 1 minute after the start of rotation (also referred to as "the B60 value" in the present specification) is preferably in the range of 300 to 450 mPa·s, and more preferably 350 to 450 mPa·s, in terms of obtaining a coating film with excellent metallic luster. When the solids content is adjusted to 1.0 mass %, the "B60 value" is preferably in the range of 50 to 500 mPa·s, and more preferably 150 to 500 mPa·s. When the solids content is adjusted to 1.5 mass %, the "B60 value" is preferably in the range of 50 to 480 mPa·s, and more preferably 75 to 480 mPa·s. When the solids content is adjusted to 2.0 mass %, the "B60 value" is preferably in the range of 40 to 450 mPa·s, and more preferably 40 to 420 mPa·s. When the solids content is adjusted to 2.5 mass %, the "B60 value" is preferably in the range of 40 to 400 mPa·s, and more preferably 40 to 350 mPa·s. When the solids content is adjusted to 3.0 mass %, the "B60 value" is preferably in the range of 40 to 250 mPa·s, and more preferably 40 to 200 mPa·s. The viscometer used in this case is a Brookfield type viscometer (trade name: LVDV-I, produced by Brookfield).

Ti Value

The "TI value (thixotropic index)" as used herein is the value described in JIS K 5101-6-2 (2004), Pigment Test Method, Section 2, Rotational Viscometer Method, and can be determined by measuring the viscosity (mPa·s) using a Brookfield type viscometer at 20° C. at 6 rpm and 60 rpm, and calculating the "viscosity measured at 6 rpm/viscosity measured at 60 rpm." The measured Ti values within the range of 3.0 to 7.0 satisfy the requirements for the pigment dispersion paste comprising the effect pigment dispersion of the present invention. The TI value is preferably 3.5 to 6.0. A Ti value of 3.0 or more is preferable in terms of the difficulty in precipitation of the pigment, and a Ti value of 5.0 or less is preferably in terms of suppressing the aggregation of the pigment.

Specular Gloss (60o Gloss)

The 60-degree specular gloss of a multilayer coating film is preferably 110 to 250 when the multilayer coating film is obtained by applying the effect pigment dispersion of the present invention to a dry film thickness of 0.1 to 3.0 µm to a colored coating film to form an effect coating film, and then further forming a clear coating film on the effect coating film.

The present invention specifies the 60-degree specular gloss of a multilayer coating film obtained by applying the effect pigment dispersion of the present invention to a dry film thickness of 0.1 to 3.0 µm to form an effect coating film, and then further forming a clear coating film on the effect coating film. However, this does not mean that the 60-degree specular gloss is within the above range whenever the film thickness of the effect coating film is 0.1 to 3.0 µm, but specifies 60-degree specular gloss when it is any of the numerical values within the above range.

In one embodiment, the 60-degree specular gloss of a multilayer coating film is preferably 150 to 240, in terms of high glossiness, the multilayer coating film being obtained by applying the effect pigment dispersion of the present invention containing a flake aluminum pigment having a thickness of 0.01 to 0.2 µm to a dry film thickness of 0.1 to 0.3 µm to a colored coating film to form an effect coating film, and then further forming a clear coating film on the effect coating film.

The specular gloss means a ratio of specular light from an object surface to specular light from a reference surface (glass with a refractive index of 1.567), and is the numerical value defined by JIS-Z8741. Specifically, the luminous flux of a prescribed opening angle is allowed to enter the measuring sample surface at a specified incident angle, and the luminous flux of the prescribed opening angle reflected in the direction of specular reflection is measured by an optical receiver. This is a numerical value measured using a so-called glossmeter. In the present specification, a value measured using a glossmeter (micro-TRI-gloss, produced by BYK-Gardner) is defined as the 60-degree specular gloss (60° gloss). When the numerical value of 60-degree specular gloss is larger, the glossiness of the coating film is higher.

Graininess

The amount and composition of the above components are preferably adjusted so that the HG value of a multilayer coating film is 10 to 65, the multilayer coating film being obtained by applying the effect pigment dispersion of the present invention to a dry film thickness of 0.1 to 3.0 µm to a colored coating film to form an effect coating film, and then further forming a clear coating film on the effect coating film.

The present invention specifies the HG value of a multilayer coating film obtained by applying the effect pigment dispersion of the present invention to a dry film thickness of 0.1 to 3.0 µm to form an effect coating film, and then further forming a clear coating film on the effect coating film. However, this does not mean that the HG value is within the above range whenever the film thickness of the effect coating film is 0.1 to 3.0 µm, but specifies the HG value when it is any of the numerical values within the above range.

In one embodiment, the HG value of a multilayer coating film obtained by applying the effect pigment dispersion of the present invention containing a flake aluminum pigment having a thickness of 0.01 to 0.2 µm to a dry film thickness of 0.1 to 0.3 µm to a colored coating film to form an effect coating film from the effect pigment dispersion, and then further forming a transparent clear coating film, is preferably 10 to 40, in terms of the denseness of the metallic coating film.

The graininess is expressed by a hi-light graininess value (hereinafter abbreviated as the "HG value"). The HG value is a parameter of micro-brilliance obtained by the microscopic observation of a coating surface, and indicates the graininess in the highlight (the coating film is observed in the vicinity of specular reflection against incident light). The coating film is photographed with a CCD camera at a light incidence angle of 15° and a receiving angle of 0°, and the obtained digital image data (two-dimensional brilliance distribution data) is subjected to two-dimensional Fourier transformation to obtain a power spectrum image. Subsequently, only the spatial frequency area corresponding to graininess is extracted from the power spectrum image, and the obtained measurement parameter is converted to an HG value from 0 to 100 that has a linear relation with graininess. Specifically, the HG value can be measured using a microbrilliance meter. The details of the measurement method are described in "Research on Coatings," Kansai Paint Technical Report, No. 138, August 2002: pp. 8-24, and "Research on Coatings," Kansai Paint Technical Report, No. 132, August 2002: pp. 8-24. A lower HG value as graininess indicates less graininess on the surface of the coating film.

Method for Forming Multilayer Coating Film

The method for forming a multilayer coating film of the present invention comprises applying a colored coating composition to a substrate to form a colored coating film, applying the effect pigment dispersion to the formed cured or uncured colored coating film to form an effect coating film, and applying a clear paint to the formed cured or uncured effect coating film to form a clear coating film.

Substrate

The multilayer coating film of the present invention is formed on a substrate shown below. Examples of the substrate include metal materials including metals, such as iron, zinc, and aluminum and alloys containing these metals; molded products of these metals; molded products of glass, plastic, foam, and the like. Degreasing treatment or surface treatment can be suitably performed depending on these materials to obtain substrates. Examples of the surface treatment include phosphate treatment, chromate treatment, composite oxide treatment, and the like. Furthermore, when the material of the substrate is metal, it is preferable that an undercoating film is formed on a surface-treated metal material using a cationic electrodeposition coating composition or the like. Moreover, when the material of the substrate is plastic, it is preferable that a primer coating film is formed on a degreased plastic material using a primer coating composition.

Colored Coating Composition

As the colored coating composition, a known thermosetting coating composition comprising a binder resin such as a base resin or a crosslinking agent, a pigment, and a solvent such as an organic solvent and/or water, as main components can be specifically used. Examples of the thermosetting coating composition include intermediate coating compositions, base coating compositions, and the like.

Examples of the base resin used in the colored coating composition include thermosetting resins, room-temperature-curable resins, and the like. However, in terms of water resistance, chemical resistance, weather resistance, and the like, thermosetting resins are preferably used.

The base resin is preferably a resin that has excellent weather resistance, transparency, and the like. Specific examples include acrylic resins, polyester resins, epoxy resins, urethane resins, and the like.

Examples of acrylic resins include resins obtained by copolymerizing α,β-ethylenically unsaturated carboxylic acids, (meth)acrylic acid esters having a functional group, such as a hydroxyl group, an amide group, a methylol group, or an epoxy group, other (meth)acrylic acid esters, styrene, and the like.

Examples of polyester resins include polyester resins obtained by the condensation reaction of polyhydric alcohols, such as ethylene glycol, propylene glycol, butylene glycol, 1,6-hexanediol, trimethylolpropane, and pentaerythritol, with polyvalent carboxylic acid components, such as adipic acid, isophthalic acid, terephthalic acid, phthalic anhydride, hexahydrophthalic anhydride, and trimellitic anhydride.

Examples of epoxy resins include so-called bisphenol A type epoxy resins produced by the condensation reaction of bisphenol A with epichlorohydrin.

Examples of urethane resins include compounds obtained by addition reaction of a diisocyanate compound and a polyhydric alcohol, and urethane resins whose molecular weight is increased by reacting an acrylic resin, a polyester resin, or an epoxy resin mentioned above with a diisocyanate compound.

The colored coating composition may be an aqueous coating composition or a solvent-based coating composition. However, in terms of reducing the VOC of the coating composition, the colored coating composition is preferably an aqueous coating composition. When the colored coating composition is an aqueous coating composition, the base resin can be made soluble in water or dispersed in water by using a resin containing a hydrophilic group, such as a carboxyl group, a hydroxyl group, a methylol group, an amino group, a sulfonic acid group, or a polyoxyethylene bond, most generally a carboxyl group, in an amount sufficient for making the resin soluble in water or dispersed in water, and neutralizing the hydrophilic group to form an alkali salt. The amount of the hydrophilic group (e.g., a carboxyl group) used in this case is not particularly limited, and can be suitably selected depending on the degree of water solubilization or water dispersion. However, the amount of the hydrophilic group is generally such that the acid value is about 10 or more mgKOH/g, and preferably 30 to 200 mgKOH/g. Examples of the alkaline substance used in neutralization include sodium hydroxide, amine compounds, and the like.

Moreover, dispersion of the above resin in water can be performed by emulsion polymerization of the polymerizable components in the presence of a surfactant and a water-soluble resin. Furthermore, the water dispersion can also be obtained by, for example, dispersing the above resin in water in the presence of an emulsifier. In the water dispersion, the base resin may not contain the above hydrophilic group at all, or may contain the above hydrophilic group in an amount less than that of the water-soluble resin.

The crosslinking agent is used to perform crosslinking and curing of the above base resin by heating, and those exemplified as the crosslinkable component in the effect pigment dispersion can be used.

The ratio of each component in the colored coating composition may be freely selected as required. However, in terms of water resistance, finish, and the like, it is generally preferable that the ratio of the base resin is 60 to 90 mass %, and particularly 70 to 85 mass %, based on the total mass of both components; and that the ratio of the crosslinking agent is 10 to 40 mass %, and particularly 15 to 30 mass %, based on the total mass of both components.

The pigment provides color and substrate-masking properties to the colored coating film formed from the colored coating composition. The type and amount of the pigment can be suitably adjusted depending on the hue or lightness required for the multilayer coating film. For example, by adjusting the type and amount of the pigment, the lightness L* value of the coating film obtained from the colored coating composition (X) can be adjusted within the range of 0.1 to 80, preferably 0.1 to 70, and more preferably 0.1 to 60. Examples of the pigment include metallic pigments, rust preventive pigments, color pigments, extender pigments, and the like. Of these, color pigments are preferably used, and black pigments are more preferably used in terms of obtaining a coating film with excellent substrate-masking properties and metallic luster. The type and amount of the pigment in the colored coating composition (X) are preferably adjusted so that L* of the colored coating film is within the above range.

The cured film thickness of the colored coating film obtained from the colored coating composition is preferably 3 μm to 50 μm, more preferably 5 to 45 μm, and even more preferably 8 to 40 μm, in terms of substrate-masking properties, the metallic luster of the multilayer coating film, and the like. For example, the cured film thickness is 15 μm to 50 μm, preferably 18 to 45 μm, and more preferably 20 to 40 μm.

Coating of the colored coating composition can be performed by a general method. When the colored coating composition is an aqueous coating composition, for example, deionized water and optionally additives, such as a thickener and an antifoaming agent, are added to the colored coating composition so that the solids content is adjusted to about 30 to 70 mass % and the viscosity is adjusted to 500 to 6000 cps/6 rpm (Brookfield type viscometer). Then, the resultant is applied to the substrate surface by spray coating, rotary atomization coating, or the like. An electrostatic charge may be applied, if necessary, during coating.

The monochrome hiding film thickness of the colored coating composition (X) is preferably 80 μm or less, more preferably 10 to 60 μm, and even more preferably 15 to 50 μm, in terms of color stability. In the present specification, the "monochrome hiding film thickness" is a value obtained in the following manner. The monochrome checkered hiding power test paper specified in 4.1.2 of JIS K5600-4-1 is attached to a steel plate. Then, the coating composition is applied by inclined coating so that the film thickness continuously varies, and dried or cured. The coating surface is then visually observed under diffused daylight, and the minimum film thickness in which the monochrome border of the checker of the hiding power test paper disappears is measured by an electromagnetic film thickness meter. The measured value is the "monochrome hiding film thickness."

In the method for forming a multilayer coating film of the present invention, it is preferable, in terms of the adhesion and water resistance of the multilayer coating film, to apply a colored coating composition, apply the effect pigment dispersion to the formed uncured coating film to form an effect coating film, apply a clear paint to the formed uncured effect coating film to form an uncured clear coating film, and simultaneously cure these three uncured coating films by heating.

When the effect pigment dispersion is applied to the uncured coating film formed from the colored coating composition, after coating of the colored coating composition, the resultant is allowed to stand at ordinary temperature for 15 to 30 minutes, or heated at a temperature of 50 to 100° C. for 30 seconds to 10 minutes, and then the effect pigment dispersion can be applied.

Coating of Effect Pigment Dispersion

In the method for forming a multilayer coating film of the present invention, the solids content of the effect pigment dispersion during coating is preferably adjusted to 0.1 to 15 mass %, more preferably 0.1 to 10 mass %, even more preferably 0.5 to 7.0 mass %, and particularly preferably 0.5 to 3.0 mass %, based on the effect pigment dispersion, in terms of obtaining a coating film with excellent metallic luster.

The effect pigment dispersion can be applied by a method such as electrostatic spraying, air spray coating, or airless spray coating. In the method for forming a multilayer coating film of the present invention, rotary atomization type electrostatic spraying is particularly preferable.

The film thickness 30 seconds after the effect pigment dispersion is attached to the substrate is preferably 3 to 55 μm, more preferably 4 to 50 μm, and even more preferably 5 to 45 μm, in terms of obtaining a coating film with excellent metallic luster. When the effect pigment dispersion contains a flake aluminum pigment having a thickness of 0.01 to 0.2 μm, the film thickness 30 seconds after the effect pigment dispersion is attached to the substrate is preferably 3 to 25 μm, more preferably 4 to 24 μm, and even more preferably 5 to 23 μm.

After coating of the effect pigment dispersion, the resultant is allowed to stand at ordinary temperature for 15 to 30 minutes or heated at a temperature of 50 to 100° C. for 30 seconds to 10 minutes, and then the clear paint can be applied.

The thickness of the effect coating film, as dry film thickness, is preferably 0.1 to 3.0 μm, and more preferably 0.15 to 2.5 μm. When the effect pigment dispersion contains a flake aluminum pigment having a thickness of 0.01 to 0.2 μm, the thickness of the effect coating film, as dry film thickness, is preferably 0.05 to 2.0 μm, and more preferably 0.08 to 1.6 μm.

In the method for forming a multilayer coating film of the present invention, a clear paint is applied to the effect coating film obtained by applying the effect pigment dispersion to form a clear coating film.

Clear Paint

As the clear paint, any known thermosetting clear coating compositions can be used. Examples of thermosetting clear coating compositions include organic solvent-type thermosetting coating compositions, aqueous thermosetting coating compositions, powder thermosetting coating compositions, and the like containing a curing agent and a base resin having a crosslinkable functional group.

Examples of the crosslinkable functional group of the base resin include a carboxyl group, a hydroxyl group, an epoxy group, a silanol group, and the like. Examples of the type of base resin include acrylic resins, polyester resins, alkyd resins, urethane resins, epoxy resins, fluororesins, and the like. Examples of curing agents include polyisocyanate compounds, blocked polyisocyanate compounds, melamine resins, urea resins, carboxy-containing compounds, carboxy-containing resins, epoxy-containing resins, epoxy-containing compounds, and the like.

The combination of base resin/curing agent of the clear paint is preferably carboxy-containing resin/epoxy-containing resin, hydroxy-containing resin/polyisocyanate compound, hydroxy-containing resin/blocked polyisocyanate compound, or hydroxy-containing resin/melamine resin.

The clear paint may be a one-component coating composition, or a multi-component coating composition such as a two-component coating composition.

Preferable as the clear paint among these is a two-component clear paint containing a hydroxy-containing resin and a polyisocyanate compound described below, in terms of the adhesion of the coating film to be obtained.

Hydroxy-Containing Resin

As the hydroxy-containing resin, conventionally known resins can be used without limitation, as long as they are resins containing a hydroxyl group. Examples of the hydroxy-containing resin include hydroxy-containing acrylic resins, hydroxy-containing polyester resins, hydroxy-containing polyether resins, hydroxy-containing polyurethane resins, and the like; preferably hydroxy-containing acrylic resins and hydroxy-containing polyester resins; and particularly preferably hydroxy-containing acrylic resins.

The hydroxy value of the hydroxy-containing acrylic resin is preferably within the range of 80 to 200 mgKOH/g, and more preferably 100 to 180 mgKOH/g, in terms of the scratch resistance and water resistance of the coating film.

The weight average molecular weight of the hydroxy-containing acrylic resin is preferably within the range of 2500 to 40000, and more preferably 5000 to 30000, in terms of the acid resistance and smoothness of the coating film.

In the present specification, the weight average molecular weight refers to a value calculated from a chromatogram measured by gel permeation chromatography based on the molecular weight of standard polystyrene. For the gel permeation chromatography, "HLC8120GPC" (produced by Tosoh Corporation) was used. The measurement was conducted using four columns: "TSKgel G-4000HXL," "TSKgel G-3000HXL," "TSKgel G-2500HXL," and "TSKgel G-2000HXL" (trade names, all produced by Tosoh Corporation) under the following conditions: mobile phase: tetrahydrofuran, measuring temperature: 40° C., flow rate: 1 cc/min, and detector: RI.

The glass transition temperature of the hydroxy-containing acrylic resin is preferably −40° C. to 20° C., and particularly preferably −30° C. to 10° C. When the glass transition temperature is −40° C. or more, the coating film hardness is sufficient. When the glass transition temperature is 20° C. or less, the coating surface smoothness of the coating film can be maintained.

Polyisocyanate Compound

The polyisocyanate compound is a compound having at least two isocyanate groups per molecule. Examples include aliphatic polyisocyanates, alicyclic polyisocyanates, aliphatic-aromatic polyisocyanates, aromatic polyisocyanates, derivatives of these polyisocyanates, and the like.

Examples of aliphatic polyisocyanates include aliphatic diisocyanates, such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate, and 2,6-diisocyanatomethyl hexanoate (common name: lysine diisocyanate); aliphatic triisocyanates, such as 2,6-diisocyanatohexanoate, 2-isocyanatoethyl, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane, and 2,5,7-trimethyl-1,8-diisocyanato-5-isocyanatomethyloctane; and the like.

Examples of alicyclic polyisocyanates include alicyclic diisocyanates, such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4-methyl-1,3-cyclohexylene diisocyanate (common name: hydrogenated TDI), 2-methyl-1,3-cyclohexylene diisocyanate, 1,3- or 1,4-bis(isocyanatomethyl)cyclohexane (common name: hydrogenated xylylene diisocyanate) or mixtures thereof, and methylenebis(4,1-cyclohexanediyl)diisocyanate (common name: hydrogenated MDI), and norbornane diisocyanate; alicyclic triisocyanates, such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di (isocyanatomethyl)-bicyclo(2.2.1)heptane, 5-(2-isocyanatoethyl)-2-isocyanatomethy-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)heptane, and 6-(2-isocyanatoethyl)-2-isocyanatomethyl-2-(3-isocyanatopropyl)-bicyclo(2.2.1) heptane; and the like.

Examples of aromatic-aliphatic polyisocyanates include aromatic-aliphatic diisocyanates, such as methylenebis(4,1-phenylene)diisocyanate (common name: MDI), 1,3- or 1,4-xylylene diisocyanate or mixtures thereof, G), ω,ω'-diisocyanato-1,4-diethylbenzene, and 1,3- or 1,4-bis(1-isocyanato-1-methylethyl)benzene (common name: tetramethylxylylene diisocyanate) or mixtures thereof; aromatic-aliphatic triisocyanates, such as 1,3,5-triisocyanatomethylbenzene; and the like.

Examples of aromatic polyisocyanates include aromatic diisocyanates, such as m-phenylene diisocyanate, p-phenylene diisocyanate, 4,4'-diphenyldiisocyanate, 1,5-naphthalene diisocyanate, 2,4-tolylene diisocyanate (common name: 2,4-TDI), or 2,6-tolylene diisocyanate (common name: 2,6-TDI) or mixtures thereof, 4,4'-toluidine diisocyanate, and 4,4'-diphenylether diisocyanate; aromatic triisocyanates, such as triphenylmethane-4,4',4''-triisocyanate, 1,3,5-triisocyanatobenzene, and 2,4,6-triisocyanatotoluene; aromatic tetraisocyanates, such as 4,4'-diphenylmethane-2,2',5,5'-tetraisocyanate; and the like.

Examples of polyisocyanate derivatives include dimers, trimers, biurets, allophanates, urethodiones, urethoimines, isocyanurates, oxadiazinetriones, polymethylene polyphenyl polyisocyanates (crude MDI, polymeric MDI), crude TDI, and the like, of the above-mentioned polyisocyanates. These polyisocyanate derivatives may be used singly or in a combination of two or more.

The above polyisocyanates and derivatives thereof may be used singly or in a combination of two or more.

Among the aliphatic diisocyanates, hexamethylene diisocyanate compounds are preferably used, and among the alicyclic diisocyanates, 4,4'-methylenebis(cyclohexylisocyanate) is preferably used. Of these, derivatives of hexamethylene diisocyanate are particularly the most preferable, in terms of adhesion, compatibility, and the like.

As the polyisocyanate compound, it is also possible to use a prepolymer formed by reacting the polyisocyanate or a derivative thereof with a compound having active hydrogen, such as hydroxy or amino, and reactive to the polyisocyanate under conditions such that the isocyanate groups are present in excess. Examples of the compound reactive to the polyisocyanate include polyhydric alcohols, low-molecular-weight polyester resins, amine, water, and the like.

Further, the polyisocyanate compound can be a blocked polyisocyanate compound in which the isocyanate groups of the above polyisocyanate or a derivative thereof are blocked with a blocking agent.

Examples of the blocking agent include phenol compounds, such as phenol, cresol, xylenol, nitrophenol, ethylphenol, hydroxydiphenyl, butylphenol, isopropylphenol, nonylphenol, octylphenol, and methyl hydroxybenzoate; lactam compounds, such as ε-caprolactam, δ-valerolactam, γ-butyrolactam, and β-propiolactam; aliphatic alcohols, such as methanol, ethanol, propyl alcohol, butyl alcohol, amyl alcohol, and lauryl alcohol; ethers, such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, and methoxymethanol; alcohols, such as benzyl alcohol, glycolic acid, methyl glycolate, ethyl glycolate, butyl glycolate, lactic acid, methyl lactate, ethyl lactate, butyl lactate, methylol urea, methylol melamine, diacetone alcohol, 2-hydroxyethyl acrylate, and 2-hydroxyethyl methacrylate; oximes, such as formamide oxime, acetamide oxime, acetoxime, methyl ethyl ketoxime, diacetyl monoxime, benzophenone oxime, and cyclohexane oxime; active methylenes, such as dimethyl malonate, diethyl malonate, ethyl acetoacetate, methyl acetoacetate, and acetylacetone; mercaptans, such as butyl mercaptan, t-butyl mercaptan, hexyl mercaptan, t-dodecyl mercaptan, 2-mercaptobenzothiazole, thiophenol, methylthiophenol, and ethylthiophenol; acid amides, such as acetanilide, acetanisidide, acetotoluide, acrylamide, methacrylamide, acetic acid amide, stearic acid amide, and benzamide; imides, such as succinimide, phthalimide, and maleimide; amines, such as diphenylamine, phenylnaphthylamine, xylidine, N-phenylxylidine, carbazole, aniline, naphthylamine, butylamine, dibutylamine, and butylphenylamine; imidazoles, such as nidazole and 2-ethylimidazole; ureas, such as urea, thiourea, ethylene urea, ethylenethiourea, and diphenylurea; carbamate esters, such as pheyl N-phenylcarbamate; imines, such as ethyleneimine and propyleneimine; sulfites, such as sodium bisulfite and potassium bisulfite; azole-based compounds; and the like. Examples of the azole-based compounds include pyrazole or pyrazole derivatives, such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole; imidazole or imidazole derivatives, such as imidazole, benzimidazole, 2-methylimidazole, 2-ethylimidazole, and 2-phenylimidazole; and imidazoline derivatives, such as 2-methylimidazoline and 2-phenylimidazoline.

When blocking is performed (a blocking agent is reacted), it can be performed by adding a solvent, if necessary. As the solvent used in the blocking reaction, a solvent that is not reactive with an isocyanate group is preferably used. Examples include ketones, such as acetone and methyl ethyl ketone; esters, such as ethyl acetate; N-methyl-2-pyrrolidone (NMP); and like solvents.

The polyisocyanate compounds can be used singly or in a combination of two or more.

The polyisocyanate compounds can be used singly or in a combination of two or more. In the present invention, the equivalent ratio (OH/NCO) of the hydroxyl groups of the hydroxy-containing resin to the isocyanate groups of the polyisocyanate compound is preferably 0.5 to 2.0, and more preferably 0.8 to 1.5, in terms of the curability, scratch resistance, etc., of the coating film.

When a two-component clear paint containing a hydroxy-containing resin and a polyisocyanate compound is used as the clear paint, a form in which the hydroxy-containing resin and the polyisocyanate compound are separated is preferable in terms of storage stability. Both components are mixed immediately before use.

A one-component coating composition may be used as the clear paint. Examples of the combination of base resin/curing agent in the one-component coating composition include carboxyl-containing resin/epoxy-containing resin, hydroxy-containing resin/blocked polyisocyanate compound, hydroxy-containing resin/melamine resin, etc.

The clear paint may further suitably contain additives, such as solvents (e.g., water and organic solvents), curing catalysts, antifoaming agents, and ultraviolet absorbers, if necessary.

The clear paint may suitably contain a color pigment within a range that does not impair transparency. As the color pigment, conventionally known pigments for ink or coating compositions can be used singly or in a combination of two or more. The amount thereof to be added may be suitably determined, but is preferably 30 parts by mass or less, and more preferably 0.01 to 10 parts by mass, based on 100 parts by mass of the vehicle-forming resin composition in the clear paint (Z).

The form of the clear paint is not particularly limited. The clear paint is generally used as an organic solvent-based coating composition. Examples of the organic solvent used in this case include various organic solvents for coating compositions, such as aromatic or aliphatic hydrocarbon solvents, ester solvents, ketone solvents, ether solvents, and the like. As the organic solvent used herein, the one used in the preparation of the hydroxy-containing resin may be used as is, or other organic solvents may be further suitably added.

The solids concentration of the clear paint is preferably about 30 to 70 mass %, and more preferably about 40 to 60 mass.

The clear paint is applied to the effect coating film. The coating of the clear paint is not particularly limited, and the same method as those for the colored coating composition may be used. For example, the clear paint can be applied by a coating method, such as air spray coating, airless spray coating, rotary atomization coating, or curtain coating. In these coating methods, an electrostatic charge may be applied, if necessary. Among these, rotary ataization coating using an electrostatic charge is preferable. The coating amount of the clear paint is generally preferably an amount in which the cured film thickness is about 10 to 50 μm.

Moreover, when the clear paint is applied, it is preferable to suitably adjust the viscosity of the clear paint within a viscosity range suitable for the coating method. For example, for rotary atomization coating using an electrostatic charge, it is preferable to suitably adjust the viscosity of the clear paint within a range of about 15 to 60 seconds measured by a Ford cup No. 4 viscometer at 20° C. using a solvent, such as an organic solvent.

In the method for forming a multilayer coating film of the present invention, the uncured colored coating film, the uncured effect coating film, and the uncured clear coating film can be heated to thereby simultaneously cure these three coating films. Heating can be performed by a known method. For example, a drying furnace, such as a hot-blast furnace, an electric furnace, or an infrared beam heating furnace, can be used. The heating temperature is preferably within the range of 70 to 150° C., and more preferably 80 to 140° C. The heating time is not particularly limited, but is preferably within the range of 10 to 40 minutes, and more preferably 20 to 30 minutes.

The present invention includes a multilayer coating film comprising a colored coating film formed from a colored coating composition, an effect coating film formed from an effect pigment dispersion on the colored coating film, and a clear coating film formed from a clear paint on the effect coating film. The colored coating composition, the effect pigment dispersion, the clear paint, and the method for forming a multilayer coating film are as described above. It is preferable to heat the three uncured coating films, i.e., the colored coating film, the effect coating film, and the clear coating film, to simultaneously cure them.

EXAMPLES

The present invention is described in more detail below with reference to Examples and Comparative Examples. However, the present invention is not limited only to these Examples. "Part(s)" and "%" are both based on mass.

Test 1

1. Production of Effect Pigment Dispersion (Y)

Example 1: Preparation of Effect Pigment Dispersion (Y-1)

69 parts of distilled water, 1 part of the surface adjusting agent (A-1), 5 parts (solids content of 0.5 parts) of Hydroshine WS-3004 (trade name, an aqueous vapor-deposition aluminum flake pigment, produced by Eckart, solids content: 10%; internal solvent: isopropanol, average particle size D50: 13 μm, thickness: 0.05 μm; the surface was treated with silica), and 14.5 parts (solids content of 0.29 parts) of Rheocrysta (trade name, a cellulose-based rheology control agent=cellulose nanofiber gel, produced by Dai-Ichi Kogyo Seiyaku Co., Ltd., solids content: 2%) were blended, stirred, and mixed, thereby preparing an effect pigment dispersion (Y-1).

Examples 2 to 16: Preparation of Effect Pigment Dispersions (Y-2) to (Y-16)

Effect pigment dispersions (Y-2) to (Y-16) were obtained in the same manner as in Example 1, except that the formulations shown in Table 1 were used.

Comparative Examples 1 to 7: Preparation of Effect Pigment

Dispersions (Y-17) to (Y-23) Effect pigment dispersions (Y-17) to (Y-23) were obtained in the same manner as in Example 1, except that the formulations shown in Table 1 were used.

Surface Adjusting Agent (A)

Table 1 shows the properties of surface adjusting agents (A) used in the production of the effect pigment dispersions (Y) shown in Table 1.

(A-1) to (A-3) are all commercially available surface adjusting agents. (A-1) is a silicone-based surface adjusting agent, (A-2) is a mixture of a surface adjusting agent of an amphiphilic oligomer and a silicone-based surface adjusting agent, and (A-3) is polyether-based siloxane. (A-1) Trade name "BYK348," produced by BYK, a silicone-based surface adjusting agent; contact angle: 13°, dynamic surface tension: 63.9 mN/m, static surface tension: 22.2 mN/m, lamellae length: 7.45 mm, nonvolatile content: 100 mass % (A-2) Trade name "BYK346," produced by BYK, a silicone-based surface adjusting agent; contact angle: 12°, dynamic surface tension: 51.5 mN/m, static surface tension: 21.6 mN/m, lamellae length: 7.40 mm, nonvolatile content: 100 mass % (A-3) Trade name "BYK347," produced by BYK, a silicone-based surface adjusting agent; contact angle: 14°, dynamic surface tension: 68.7 mN/m, static surface tension: 21.9 mN/m, lamellae length: 7.46 mm, nonvolatile content: 100 mass %

The above contact angle is a contact angle with respect to a previously degreased tin plate (produced by Paltek Corporation) measured in such a manner that a mixed solution prepared by mixing isopropanol, water, and the surface adjusting agent (A) at a ratio of 4.5/95/1 is adjusted to have a viscosity of 150 mPa·s measured by a Brookfield type viscometer at a rotor rotational speed of 60 revolutions per minute at a temperature of 20° C. by the addition of Acrysol ASE-60 (trade name, a polyacrylic acid-based rheology control agent, produced by The Dow Chemical Company, solids content: 28) and dimethylethanolamine, 10 µL of the solution is added dropwise to the tin plate, and the contact angle with respect to the tin plate is measured by a contact angle meter (CA-X150, trade name, produced by Kyowa Chemical Industry Co., Ltd.) 10 seconds after dropping.

Production of Phosphate Group-Containing Resin

A mixed solvent of 27.5 parts of methoxy propanol and 27.5 parts of isobutanol was placed in a reaction vessel equipped with a thermometer, a thermostat, a stirrer, a reflux condenser, and a dropping funnel, and heated to 110° C. While the temperature was maintained at 110° C., 121.5 parts of a mixture comprising 25 parts of styrene, 27.5 parts of n-butyl methacrylate, 20 parts of branched higher alkyl acrylate (trade name: "Isostearyl Acrylate," produced by Osaka Organic Chemical Industry Ltd.), 7.5 parts of 4-hydroxybutyl acrylate, 15 parts of a phosphate group-containing polymerizable monomer described below, 12.5 parts of 2-methacryloyloxyethyl acid phosphate, 10 parts of isobutanol, and 4 parts of tert-butylperoxy octanoate was added dropwise to the above mixed solvent over 4 hours. Further, a mixture comprising 0.5 parts of tert-butylperoxy octanoate and 20 parts of isopropanol was added dropwise for 1 hour. Then, the resultant was stirred and aged for 1 hour, thereby obtaining a phosphate group-containing resin solution having a solids content of 50%. The phosphate group-containing resin had an acid value of 83 mgKOH/g, a hydroxy value of 29 mgKOH/g, and a weight average molecular weight of 10,000.

Phosphate group-containing polymerizable monomer: 57.5 parts of monobutyl phosphoric acid and 41 parts of isobutanol were placed in a reaction vessel equipped with a thermometer, a thermostat, a stirrer, a reflux condenser, and a dropping funnel, and heated to 90° C. After 42.5 parts of glycidyl methacrylate was added dropwise over 2 hours, the mixture was stirred and aged for 1 hour. Thereafter, 59 parts of isopropanol was added, thereby obtaining a phosphate group-containing polymerizable monomer solution having a solids content of 50%. The acid value of the obtained monomer was 285 mgKOH/g.

Details of Annotated Components in Table 1

Note 1: Alpaste EMR B6360: trade name, flake aluminum pigment paste, produced by Toyo Aluminium K.K., solids content: 47%, internal solvent: propylene glycol monomethyl ether, average particle size D50: 11 µm, thickness: 0.2 µm; the surface was treated with silica.

Note 2: IL 2153 (STAPA IL HYDOLAN 2153): trade name, flake aluminum pigment paste, produced by Eckart, solids content: 65%, internal solvent: isopropanol, average particle size D50: 24 Nm, thickness: 0.4 µm; the surface was treated with silica.

Note 3: SP-900: trade name, hydroxyethyl cellulose, solids content: 1%, produced by Daicel Finechem Ltd.

Note 4: Acrysol ASE-60: trade name, a polyacrylic acid-based rheology control agent, produced by The Dow Chemical Company, solids content: 28%

Note 5: DISPARLON AQ-630: trade name, a polyamide-based rheology control agent, produced by Kusumoto Chemicals, Ltd., solids content: 18%

Note 6: LAPONITE RD dispersion: a dispersion (solid content: 10%) obtained by previously stirring and dispersing LAPONITE RD (trade name, synthetic layered silicate, produced by BYK) in deionized water Note 7: Imprafix 2794 XP: trade name, produced by Covestro AG, a blocked aliphatic polyisocyanate compound, solids content: 38% Note 8: Phosphate group-containing resin (solids content: 50 mass %) obtained in "Production of Phosphate Group-Containing Resin" above Note 9: Cymel 325: trade name, a methylated melamine resin, produced by Nihon Cytec Industries Inc., solids content: 80 mass %

Note 10: The amount (solids content) of the flake aluminum pigment based on 100 parts by mass of the total amount of components other than the flake aluminum pigment.

Note 11: TEMPO (2,2,6,6-tetramethylpiperidine 1-oxyl radical), obtained by passing cellulose nanofibers oxidized by a catalyst through an ion exchange column for neutralization with dibutylamine; solids content: 2 mass %

Measurement of Viscosity

The prepared effect pigment dispersion was placed in a predetermined container, and mixed by stirring with a rotary stirrer, while setting the rotational speed to 1000 revolutions per minute, until it became homogeneous. Thereafter, the viscosity at 6 revolutions per minute was measured at a temperature of 20° C. using a Brookfield type viscometer (trade name: LVDV-I, produced by Brookfield). Table 1 shows the viscosity 1 minute after the start of measurement (B6 value).

Moreover, the viscosity at 60 revolutions per minute measured by the Brookfield type viscometer at a temperature of 20° C. was measured. The viscosity 1 minute after the start of revolution (B60 value) was measured.

Furthermore, the Ti ratio (viscosity value measured at 6 rpm/viscosity value measured at 60 rpm) was also calculated.

TABLE 1

| | | | No. | | | |
|---|---|---|---|---|---|---|
| | | | Example 1 | Example 2 | Example 3 | Example 4 |
| Formulation | | Effect pigment dispersion name | Y-1 | Y-2 | Y-3 | Y-4 |
| | | Distilled water | 69 | 64 | 69 | 69 |
| | Flake aluminum pigment | EMR B6360 Note 1 | | | | |
| | | IL-2153 Note 2 | | | | |
| | | WS3004 | 5 (0.5) | 5 (0.5) | 5 (0.5) | 5 (0.5) |
| | Rheology control agent | Rheocrysta | 14.5 (0.29) | 9.5 (0.19) | 14.5 (0.29) | 14.5 (0.29) |
| | | SP-900 Note 3 | | 10 (0.1) | | |
| | | ASE-60 Note 4 | | | | |
| | | Dimethylethanolamine | | | | 0.02 |
| | | DISPARLON AQ-630 Note 5 | | | | |
| | | RAPONITE RD dispersion Note 6 | | | | |
| | Surface adjusting agent | A-1 | 1 | 1 | 1 | 1 |
| | | A-2 | | | | |
| | | A-3 | | | | |
| | Other components | Imprafix 2796P Note 7 | | | 0.26 (0.1) | |
| | | Phosphate group-containing resin Note 8 | | | | 0.2 (0.1) |
| | | Cymel 325 Note 9 | | | | |
| State | | Solids content (mass %) | 2.0 | 2.0 | 2.1 | 2.1 |
| | | Viscosity B6 value/mPa · s | 1000 | 800 | 900 | 800 |
| | | Viscosity B60 value/mPa · s | 230 | 210 | 220 | 210 |
| | | Ti value | 4.3 | 3.8 | 4.1 | 3.8 |
| | | Flake aluminum pigment amount Note 10 | 39 | 39 | 36 | 36 |

| | | | No. | | | |
|---|---|---|---|---|---|---|
| | | | Example 5 | Example 6 | Example 7 | Example 8 |
| Formulation | | Effect pigment dispersion name | Y-5 | Y-6 | Y-7 | Y-8 |
| | | Distilled water | 69 | 69 | 69 | 69 |
| | Flake aluminum pigment | EMR B6360 Note 1 | | | | |
| | | IL-2153 Note 2 | | | | |
| | | WS3004 | 5 (0.5) | 5 (0.5) | 5 (0.5) | 5 (0.5) |
| | Rheology control agent | Rheocrysta | 14.5 (0.29) | 14.5 (0.29) | 14.5 (0.29) | 14.5 (0.29) |
| | | SP-900 Note 3 | | | | |
| | | ASE-60 Note 4 | | | | |
| | | Dimethylethanolamine | | | | 0.02 |
| | | DISPARLON AQ-630 Note 5 | | | | |
| | | RAPONITE RD dispersion Note 6 | | | | |
| | Surface adjusting agent | A-1 | 1 | | | |
| | | A-2 | | 1 | | |
| | | A-3 | | | 1.2 (1) | |
| | Other components | Imprafix 2796P Note 7 | | | | |
| | | Phosphate group-containing resin Note 8 | | | | 0.2 (0.1) |
| | | Cymel 325 Note 9 | 0.13 (0.1) | | | |
| State | | Solids content (mass %) | 2.1 | 2.0 | 2.0 | 1.0 |
| | | Viscosity B6 value/mPa · s | 900 | 1000 | 900 | 900 |
| | | Viscosity B60 value/mPa · s | 220 | 230 | 220 | 220 |
| | | Ti value | 4.1 | 4.3 | 4.1 | 4.1 |
| | | Flake aluminum pigment amount Note 10 | 36 | 39 | 39 | 128 |

| | | | No. | | | |
|---|---|---|---|---|---|---|
| | | | Example 9 | Example 10 | Example 11 | Example 12 |
| Formulation | | Effect pigment dispersion name | Y-9 | Y-10 | Y-11 | Y-12 |
| | | Distilled water | 69 | 86 | 86 | 86 |
| | Flake aluminum pigment | EMR B6360 Note 1 | | | 5.4 (2.5) | 5.4 (2.5) |
| | | IL-2153 Note 2 | | 7.6 (5) | | |
| | | WS3004 | 5 (0.6) | | | |
| | Rheology control agent | Rheocrysta | 30 (0.6) | 14.5 (0.29) | 14.5 (0.29) | 14.5 (0.29) |
| | | SP-900 Note 3 | | | | |
| | | ASE-60 Note 4 | | | | |

TABLE 1-continued

| | | | | | | |
|---|---|---|---|---|---|---|
| | | Dimethylethanolamine | | 0.5 | | 0.5 |
| | | DISPARLON AQ-630 Note 5 | | | | |
| | | RAPONITE RD dispersion Note 6 | | | | |
| | | Cellulose nanofiber test product Note 11 | | | | |
| | Surface adjusting agent | A-1 | 1 | 1 | 1 | 1 |
| | | A-2 | | | | |
| | | A-3 | | | | |
| | Other components | Imprafix 2796P Note 7 | | | 5.3 (2.0) | |
| | | Phosphate group-containing resin Note 8 | | 4.0 (2.0) | | 4.0 (2.0) |
| | | Cymel 325 Note 9 | | | | |
| State | | Solids content (mass %) | 20 | 7.3 | 52 | 5.2 |
| | | Viscosity B6 value/mPa·s | 3100 | 1400 | 1800 | 1600 |
| | | Viscosity B60 value/mPa·s | 850 | 350 | 460 | 400 |
| | | Ti value | 3.6 | 4.0 | 3.9 | 4.0 |
| | | Flake aluminum pigment amount Note 10 | 31 | 152 | 76 | 76 |

| | | | No. | | | |
|---|---|---|---|---|---|---|
| | | | Example 13 | Example 14 | Example 15 | Example 16 |
| Formulation | | Effect pigment dispersion name | Y-13 | Y-14 | Y-15 | Y-16 |
| | | Distilled water | 86 | 86 | 86 | 69 |
| | Flake aluminum pigment | EMR B6360 Note 1 | 5.4 (2.5) | 5.4 (2.5) | 5.4 (2.5) | |
| | | IL-2153 Note 2 | | | | |
| | | WS3004 | | | | 5 (0.5) |
| | Rheology control agent | Rheocrysta | 14.5 (0.29) | 14.5 (0.29) | 14.5 (0.29) | |
| | | SP-900 Note 3 | | | | |
| | | ASE-60 Note 4 | | | | |
| | | Dimethylethanolamine | | 0.5 | 0.5 | 0.02 |
| | | DISPARLON AQ-630 Note 5 | | | | |
| | | RAPONITE RD dispersion Note 6 | | | | |
| | | Cellulose nanofiber test product Note 11 | | | | 14.5 (0.29) |
| | Surface adjusting agent | A-1 | 1 | | | 1 |
| | | A-2 | | | | |
| | | A-3 | | 1.2 (1) | | |
| | Other components | Imprafix 2796P Note 7 | | | | |
| | | Phosphate group-containing resin Note 8 | | 4.0 (2.0) | 4.0 (2.0) | 0.2 (0.1) |
| | | Cymel 325 Note 9 | 2.5 (2.0) | | | |
| State | | Solids content (mass %) | 5.3 | 5.2 | 4.3 | 2.1 |
| | | Viscosity B6 value/mPa·s | 1700 | 1500 | 1700 | 800 |
| | | Viscosity B60 value/mPa·s | 420 | 380 | 420 | 210 |
| | | Ti value | 4.0 | 3.9 | 4.0 | 3.8 |
| | | Flake aluminum pigment amount Note 10 | 76 | 76 | 109 | 36 |

| | | | No. | | | |
|---|---|---|---|---|---|---|
| | | | Comparative Example 1 | Comparative Example 2 | Comparative Example 3 | Comparative Example 4 |
| Formulation | | Effect pigment dispersion name | Y-17 | Y-18 | Y-19 | Y-20 |
| | | Distilled water | 100 | 95 | 105 | 69 |
| | Flake aluminum pigment | EMR B6360 Note 1 | 5.4 (2.5) | 5.4 (2.5) | 5.4 (2.5) | |
| | | IL-2153 Note 2 | | | | |
| | | WS3004 | | | | 10 (1) |
| | Rheology control agent | Rheocrysta | | | | 14.5 (0.29) |
| | | SP-900 Note 3 | | | | |
| | | ASE-60 Note 4 | 1.75 (0.49) | | | |
| | | Dimethylethanolamine | 0.7 | 0.5 | 0.5 | 0.02 |
| | | DISPARLON AQ-630 Note 5 | | 1.70 (0.31) | | |
| | | RAPONITE RD dispersion Note 6 | | | 12.2 (1.22) | |
| | Surface adjusting agent | A-1 | 1 | 1 | 1 | |
| | | A-2 | | | | |
| | | A-3 | | | | |
| | Other components | Imprafix 2796P Note 7 | | | | |
| | | Phosphate group-containing resin Note 8 | 4.0 (2.0) | 4.0 (2.0) | 4.0 (2.0) | 0.2 (0.1) |
| | | Cymel 325 Note 9 | | | | |
| State | | Solids content (mass %) | 5.3 | 5.4 | 5.2 | 1.5 |
| | | Viscosity B6 value/mPa·s | 1500 | 600 | 2500 | 1000 |
| | | Viscosity B60 value/mPa·s | 380 | 170 | 600 | 230 |
| | | Ti value | 3.9 | 3.5 | 4.2 | 4.3 |
| | | Flake aluminum pigment amount Note 10 | 72 | 76 | 59 | 256 |

TABLE 1-continued

| | | No. | | |
|---|---|---|---|---|
| | | Comparative Example 5 | Comparative Example 6 | Comparative Example 7 |
| Formulation | Effect pigment dispersion name | Y-21 | Y-22 | Y-23 |
| | Distilled water | 86 | 86 | 86 |
| Flake aluminum pigment | EMR B6360 Note 1 | 10.6 (5) | 10.6 (5) | 1.7 (0.8) |
| | IL-2153 Note 2 | | | |
| | WS3004 | | | |
| Rheology control agent | Rheocrysta SP-900 Note 3 | 14.5 (0.29) | 14.5 (0.29) | 14.5 (0.29) |
| | ASE-60 Note 4 | | | |
| | Dimethylethanolamine | 1 | 0.5 | 0.5 |
| | DISPARLON AQ-630 Note 5 | | | |
| | RAPONITE RD dispersion Note 6 | | | |
| Surface adjusting agent | A-1 | 1 | | 1 |
| | A-2 | | | |
| | A-3 | | | |
| Other components | Imprafix 2796P Note 7 | 5.3 (2.0) | | |
| | Phosphate group-containing resin Note 8 | 8.0 (4.0) | 4.0 (2.0) | 4.0 (2.0) |
| | Cymel 325 Note 9 | 2.5 (2) | | |
| State | Solids content (mass %) | 11.1 | 6.3 | 3.8 |
| | Viscosity B6 value/mPa·s | 5100 | 1500 | 1800 |
| | Viscosity B60 value/mPa·s | 1200 | 380 | 460 |
| | Ti value | 4.3 | 3.9 | 3.9 |
| | Flake aluminum pigment amount Note 10 | 54 | 218 | 24 |

2. Preparation of Substrate 1

A cationic electrodeposition coating composition "Elecron 9400HB" (trade name, produced by Kansai Paint Co., Ltd., an amine-modified epoxy resin-based cationic resin containing a blocked polyisocyanate compound as a curing agent) was applied by electrodeposition to a degreased and zinc phosphate-treated steel plate (JISG3141, size: 400× 300×0.8 mm) to a film thickness of 20 μm when cured. The resulting film was heated at 170° C. for 20 minutes to be cured by crosslinking, thereby obtaining a substrate 1.

3. Production of Test Plate

Example 17

A colored coating composition (X-1) "WP-522H N-2.0" (trade name, produced by Kansai Paint Co., Ltd., a polyester resin-based aqueous intermediate coating composition, L* value of the coating film to be obtained: 20) was applied to the substrate 1 to a cured film thickness of 20 μm by electrostatic spraying using a rotary atomization-type bell-shaped coating device. After the resulting film was allowed to stand for 3 minutes, preheating was performed at 80° C. for 3 minutes. Further, the effect pigment dispersion (Y-1) was adjusted to have a coating composition viscosity shown in Table 1, and applied to the resulting colored coating film to a dry coating film thickness of 0.2 μm using a robot bell (produced by ABB) under the conditions in which the booth temperature was 23° C. and the humidity was 68%. The resultant was then allowed to stand at 80° C. for 3 minutes. Subsequently, the dried coating surface was coated with a clear paint (Z-1) "KINO6500" (trade name, produced by Kansai Paint Co., Ltd., a hydroxy/isocyanate curable acrylic resin/urethane resin-based two-component organic solvent-based coating composition) to a dry coating film thickness of 35 μm using a robot bell (produced by ABB) under the conditions in which the booth temperature was 23° C. and the humidity was 68%. After coating, the resultant was allowed to stand at room temperature for 15 minutes, and then heated in a hot-air circulation-type dryer at 140° C. for 30 minutes to simultaneously dry the multilayer coating films, thereby obtaining a test plate.

The film thickness of the dry coating film shown in Table 2 was calculated from the following formula. The same applies to the following Examples and Comparative Examples.

$$x = sc/sg/S*10000$$

x: film thickness [μm]
sc: coating solids content [g]
sg: coating film specific gravity [g/cm$^3$]
S: evaluation area of coating solids content [cm$^2$]

Examples 18 to 32 and Comparative Examples 8 to 14

Test plates were obtained in the same manner as in Example 17, except that the substrates, effect dispersions, effect coating film thicknesses, and clear paints shown in Table 2 were used.

TABLE 2

| | Example | | | | | | | |
|---|---|---|---|---|---|---|---|---|
| | 17 | 18 | 19 | 20 | 21 | 22 | 23 | 24 |
| Substrate name | 1 | 1 | 1 | 1 | 1 | 1 | 1 | 1 |
| Effect dispersion (Z) name | Y-1 | Y-2 | Y-3 | Y-4 | Y4 | Y-6 | Y-7 | Y-8 |
| Dry film thickness of effect coating film (μm) | 0.2 | 0.2 | 0.2 | 0.2 | 0.2 | 0.2 | 0.2 | 0.1 |
| Clear paint (Z) name | Z-1 | Z-1 | Z-1 | Z-1 | Z-1 | Z-1 | Z-1 | Z-1 |

TABLE 2-continued

| | | | | | | | | | |
|---|---|---|---|---|---|---|---|---|---|
| Coating film performance | Graininess (HG, micro-brilliance) | 25 | 30 | 26 | 27 | 26 | 25 | 25 | 28 |
| | Anti-water adhesion (80° C. × 5 h) | Pass | Pass | Pass | Pass | Pass | Pass | Pass | Pass |
| | Anti-water adhesion after exposure to severe weather | Pass | Pass | Pass | Pass | Pass | Pass | Pass | Pass |
| | 60° gloss | 200 | 185 | 195 | 190 | 195 | 200 | 200 | 180 |

| | | Example | | | | | | | |
|---|---|---|---|---|---|---|---|---|---|
| | | 25 | 26 | 27 | 28 | 29 | 30 | 31 | 32 |
| | Substrate name | 1 | 1 | 1 | 1 | 1 | 1 | 1 | 1 |
| | Effect dispersion (Z) name | Y-9 | Y-10 | Y-11 | Y-12 | Y-13 | Y-14 | Y-15 | Y-16 |
| | Dry film thickness of effect coating film (μm) | 0.3 | 2.5 | 2.0 | 2.0 | 2.0 | 2.0 | 1.5 | 0.2 |
| | Clear paint (Z) name | Z-1 | Z-1 | Z-1 | Z-1 | Z-1 | Z-1 | Z-1 | Z-1 |
| Coating film performance | Graininess (HG, micro-brilliance) | 26 | 60 | 57 | 58 | 58 | 58 | 59 | 27 |
| | Anti-water adhesion (80° C. × 5 h) | Pass | Pass | Pass | Pass | Pass | Pass | Pass | Pass |
| | Anti-water adhesion after exposure to severe weather | Pass | Pass | Pass | Pass | Pass | Pass | Pass | Pass |
| | 60° gloss | 190 | 125 | 125 | 120 | 120 | 120 | 115 | 185 |

| | | Comparative Example | | | | | | |
|---|---|---|---|---|---|---|---|---|
| | | 8 | 9 | 10 | 11 | 12 | 13 | 14 |
| | Substrate name | 1 | 1 | 1 | 1 | 1 | 1 | 1 |
| | Effect dispersion (Z) name | Y-17 | Y-18 | Y-19 | Y-20 | Y-21 | Y-22 | Y-23 |
| | Dry film thickness of effect coating film (μm) | 0.2 | 0.2 | 0.2 | 0.2 | 3.0 | 2.5 | 1.5 |
| | Clear paint (Z) name | Z-1 | Z-1 | Z-1 | Z-1 | Z-1 | Z-1 | Z-1 |
| Coating film performance | Graininess (HG, micro-brilliance) | 65 | 65 | 80 | 26 | 65 | 70 | 80 |
| | Anti-water adhesion (80° C. × 5 h) | Pass | Pass | Pass | Fail | Pass | Fail | Pass |
| | Anti-water adhesion after exposure to severe weather | Pass | Pass | Pass | Fail | Pass | Fail | Pass |
| | 60° gloss | 105 | 105 | 105 | 150 | 105 | 105 | 100 |

4. Evaluation of Coating Film

The appearance and performance of the coating film of each test plate obtained in the above manner were evaluated. Table 2 shows the results.

The coating film appearance was evaluated by graininess, anti-water adhesion, and specular gloss (60° gloss).

Graininess

The graininess is expressed as a hi-light graininess value (hereinafter abbreviated as the "HG value"). The HG value is a parameter of micro-brilliance obtained by the microscopic observation of a coating surface, and indicates the graininess in the highlight. The HG value is calculated as follows. First, the coating surface is photographed with a CCD camera at a light incidence angle of 15° and a receiving angle of 0°, and the obtained digital image data (two-dimensional brilliance distribution data) is subjected to two-dimensional Fourier transformation to obtain a power spectrum image. Subsequently, only the spatial frequency area corresponding to graininess is extracted from the power spectrum image, and the obtained measurement parameter is converted to an HG value from 0 to 100 that has a linear relation with graininess. An HG value of 0 indicates no graininess of the effect pigment at all, and an HG value of 100 indicates the highest possible graininess of the effect pigment.

The graininess HG is preferably 10 to 65, in terms of the denseness of the metallic coating film.

Anti-Water Adhesion

Each test plate was immersed in warm water at 80° C. for 5 hours. Immediately after the test plate was removed from the water, the adhesion was evaluated according to JIS K 5600 (1999) Adhesion test (Cross-cut test). Cross-cuts reaching the substrate were made in the multilayer coating film of the test plate using a cutter knife to form a grid of 100 squares (2 mm×2 mm). Subsequently, adhesive cellophane tape was applied to the surface of the grid portion, and the tape was peeled off rapidly at 20° C. Then, the condition of squares remaining was checked, and anti-water adhesion was evaluated according to the following criteria. "Pass" is regarded as acceptable, and "Fail" is regarded as not acceptable.

Pass: 100 squares of the coating film remained, and no small edge-chipping of the coating film occurred at the edge of the cut made by the cutter knife.

Fail: The number of remaining squares of the coating film was 99 or less.

Anti-Water Adhesion after Exposure to Severe Weather

Each test plate was subjected to the following conditions for 2 hours per cycle, including irradiation with a xenon arc lamp for 1 hour and 42 minutes and raining for 18 minutes, using a super xenon weatherometer (trade name, produced by Suga Test Instruments Co., Ltd.) specified in JIS B 7754. This cycle was repeated for 2000 hours. Thereafter, the test plates were each immersed in water at 40° C. for 10 days. After removing each test plate from the water, the anti-water adhesion was evaluated according to JIS K 5600 (1999) Adhesion test (Cross-cut test). "Pass" is regarded as acceptable, and "Fail" is regarded as not acceptable.

Pass: The coating film was not removed in the vicinity of the cuts.

Fail: The coating film was removed in the vicinity of the cuts.

Specular Gloss (60° gloss)

The 60° gloss value of the test plates obtained above was measured using a gloss meter (micro-TRI-gloss, produced by BYK-Gardner).

When the 60° gloss value of a multilayer coating film obtained by forming an effect coating film on a colored coating film, and further forming a clear coating film thereon is 110 to 250 degrees, it is preferable in terms of high glossiness.

As shown in Table 2, the graininess of the coating films of Comparative Examples 10, 13, and 14 was inferior to that of the coating films of Examples 17 to 32, the anti-water adhesion of the coating films of Comparative Examples 11 and 13 was inferior to that of the coating films of Examples 17 to 32, and the specular gloss of the coating films of Comparative Examples 8 to 10 and 12 to 14 was inferior to that of the coating films of Examples 17 to 32.

Test 2
1. Production of Effect Pigment Dispersion (Y)

Production Example 1

92 parts of distilled water, 1 part of the surface adjusting agent (A-1), 5 parts (solids content of 0.5 parts) of Hydroshine WS-3004 (trade name, an aqueous vapor-deposition aluminum flake pigment, produced by Eckart, solids content: 10%, internal solvent: isopropanol, average particle size D50: 13 μm, thickness: 0.05 μm; the surface was treated with silica), 0.26 parts (solids content of 0.1 part) of Imprafix 2794 XP (trade name, produced by Covestro AG, a blocked aliphatic polyisocyanate compound, solids content: 38%), and 14.5 parts (solids content of 0.29 parts) of Rheocrysta (trade name, a cellulose-based rheology control agent=cellulose nanofiber gel, produced by Dai-Ichi Kogyo Seiyaku Co., Ltd., solids content: 2%) were blended, stirred, and mixed, thereby obtaining an effect pigment dispersion (Y-24).

The surface control agent (A-1) is the same as the surface control agent (A-1) of Test 1.

(A-1) Trade name "BYK348," produced by BYK, a silicone-based surface adjusting agent; contact angle: 130, dynamic surface tension: 63.9 mN/m, static surface tension: 22.2 mN/m, lamellae length: 7.45 mm, nonvolatile content: 100 mass %

Production Examples 2 to 12

Effect pigment dispersions (Y-25) to (Y-35) were obtained in the same manner as in Production Example 1, except that the formulations shown in Table 3 were used.

Note 1: Acrysol ASE-60: trade name, a polyacrylic acid-based rheology control agent, produced by The Dow Chemical Company, solids content: 28%

Note 2: DISPARLON AQ-630: trade name, a polyamide-based rheology control agent, produced by Kusumoto Chemicals, Ltd., solids content: 18%

Note 3: LAPONITE RD dispersion: a dispersion (solid content: 10%) obtained by previously stirring and dispersing LAPONITE RD (trade name, synthetic layered silicate, produced by BYK) in deionized water Measurement of Viscosity The B6 value, B60 value, and Ti value were measured in the same manner as in "Measurement of Viscosity" in "1. Production of Effect Pigment Dispersion (Y)" of Test 1.

Table 3

TABLE 3

Numerical values in parentheses in the table are solids contents

| | | | | Production Example No. | | | | | |
|---|---|---|---|---|---|---|---|---|---|
| | | | | 1 | 2 | 3 | 4 | 5 | 6 |
| Formulation | Effect pigment dispersion name | | | Y-24 | Y-25 | Y-26 | Y-27 | Y-28 | Y-29 |
| | Water | Distilled water | | 73.6 | 90.5 | 69 | 79.5 | 61.7 | 73.6 |
| | Surface adjusting agent A-1 | | | 1.0 | 1.0 | 1.0 | 1.0 | 1.0 | 1.0 |
| | Effect pigment (B) | Vapor-deposition aluminum flake | WS3004 | 5.0 (0.5) | 5.0 (0.5) | 5.0 (0.5) | 6.5 (0.65) | 2.0 (0.2) | 5.0 (0.5) |
| | Crosslinkable component | Blocked isocyanate compound | Imprafix 2796P | 0.26 (0.1) | 1.18 (0.45) | | 0.26 (0.1) | 0.26 (0.1) | 0.26 (0.1) |
| | Rheology control agent (C) | Rheocrysta | | 14.5 (0.29) | 14.5 (0.29) | 14.5 (0.29) | 14.5 (0.29) | 14.5 (0.29) | 12.5 (0.25) |
| | | ASE-60: Note 1 | | | | | | | |
| | | Dimethylethanolamine | | | | | | | |
| | | DISPARLON AQ-630: Note 2 | | | | | | | |
| | | LAPONITE RD dispersion Note 3 | | | | | | | |
| Performance | Light transmittance at 550 nm (%) | | | 25 | 25 | 25 | 10 | 50 | 25 |
| | Viscosity B6 value/mPa · s | | | 590 | 590 | 590 | 590 | 590 | 220 |
| | Viscosity B60 value/mPa · s | | | 150 | 150 | 150 | 150 | 150 | 56 |
| | Ti value | | | 3.9 | 3.9 | 3.9 | 3.9 | 3.9 | 3.9 |
| | Effect pigment (B) concentration of coating composition/% | | | 0.5 | 0.5 | 0.5 | 0.65 | 0.25 | 0.5 |
| | Solids concentration (%) | | | 2.0 | 2.0 | 2.0 | 2.0 | 2.0 | 2.0 |

| | | | | Production Example No. | | | | | |
|---|---|---|---|---|---|---|---|---|---|
| | | | | 7 | 8 | 9 | 10 | 11 | 12 |
| Formulation | Effect pigment dispersion name | | | Y-30 | Y-31 | Y-32 | Y-33 | Y-34 | Y-35 |
| | Water | Distilled water | | 73.6 | 400 | 445 | 120 | 87.5 | 96.5 |
| | Surface adjusting agent A-1 | | | 1.0 | 1.0 | 10 | 1.0 | 1.0 | 1.0 |
| | Effect pigment (B) | Vapor-deposition aluminum flake | WS3004 | 5.0 (0.5) | 5.0 (0.5) | 5.0 (0.5) | 5.0 (0.5) | 5.0 (0.5) | 5.0 (0.5) |

TABLE 3-continued

Numerical values in parentheses in the table are solids contents

| | | | | | | | | |
|---|---|---|---|---|---|---|---|---|
| Crossslinkable component | Blocked isocyanate compound | Imprafix 2796P | 0.26 (0.1) | 0.26 (0.1) | 0.26 (0.1) | 0.26 (0.1) | 0.26 (0.1) | 0.26 (0.1) |
| Rheology control agent (C) | Rheocrysta | | 30.0 (0.6) | 30.0 (0.6) | 7.9 (0.16) | | | |
| | ASE-60: Note 1 | | | | | | | 1.75 (0.49) |
| | Dimethylethanolamine | | | | | | | 0.18 |
| | DISPARLON AQ-630: Note 2 | | | | | | 1.70 (0.31) | |
| | LAPONITE RD dispersion Note 3 | | | | | 12.2 (1.22) | | |
| Performance | Light transmittance at 550 nm (%) | | 25 | 25 | 25 | 25 | 25 | 25 |
| | Viscosity B6 value/mPa · s | | 2500 | 1600 | 200 | 1200 | 200 | 590 |
| | Viscosity B60 value/mPa · s | | 600 | 400 | 50 | 300 | 50 | 150 |
| | Ti value | | 4.2 | 4.0 | 4.0 | 40 | 4.0 | 3.9 |
| | Effect pigment (B) concentration of coating composition/% | | 0.5 | 0.5 | 0.5 | 0.5 | 0.5 | 0.5 |
| | Solids concentration (%) | | 2.0 | 0.5 | 3.0 | 2.0 | 2.0 | 2.0 |

2. Preparation of Substrate

A substrate 1 was obtained in the same manner as in "2. Preparation of Substrate 1" of Test 1.

3. Production of Test Plate

Example 33

A test plate of Example 33 was obtained in the same manner as in Example 17 in "3. Production of Test Plate" of Test 1, except that an effect pigment dispersion (Y-24) was used as the effect pigment dispersion.

The film thickness of the dry coating film shown in Table 4 was also determined from the formula shown in Example 17.

Examples 34 to 41 and Comparative Examples 15 to 17

Test plates were obtained in the same manner as in Example 33, except that the substrates and coating compositions shown in Table 4 were used.

Table 4

The graininess, anti-water adhesion, anti-water adhesion after exposure to severe weather, and specular gloss (600 gloss) were evaluated according to the description of "4. Evaluation of Coating Film" of Test 1.

The HG value of a multilayer coating film obtained by forming an effect coating film on a colored coating film, and further forming a coating film thereon is preferably 10 to 40, in terms of the denseness of the metallic coating film. Moreover, when the 60-degree specular gloss of the multilayer coating film is 150 to 240 degrees, it is preferable in terms of high glossiness.

Visual Feeling of Metal

The test plates obtained above were each observed outdoor on a fine day while changing the angle of the test plate against outdoor light, and the luminance difference between the highlight region and the bottom region was evaluated. A higher luminance difference between the highlight region and the bottom region (flip-flop property: FF property) indicates that the coating film has excellent metal tone. The

TABLE 4

| | | Example | | | | | | | | | | Comparative Example | | |
|---|---|---|---|---|---|---|---|---|---|---|---|---|---|---|
| | | 33 | 34 | 35 | 36 | 37 | 38 | 39 | 40 | 41 | 15 | 16 | 17 |
| | Substrate name | 1 | 1 | 1 | 1 | 1 | 1 | 1 | 1 | 1 | 1 | 1 | 1 |
| | Effect dispersion (Y) name | Y-23 | Y-24 | Y-25 | Y-26 | Y-27 | Y-28 | Y-29 | Y-30 | Y-31 | Y-32 | Y-33 | Y-34 |
| | Dry film thickness of effect coating film (μm) | 0.2 | 0.2 | 0.2 | 0.3 | 0.1 | 0.2 | 0.2 | 0.2 | 0.2 | 0.2 | 0.2 | 0.2 |
| | Clear paint (Z) name | Z-1 | Z-1 | Z-1 | Z-1 | Z-1 | Z-1 | Z-1 | Z-1 | Z-1 | Z-1 | Z-1 | Z-1 |
| Coating film performance | Graininess (HG, micro-brillance) | 25 | 32 | 26 | 30 | 23 | 26 | 30 | 26 | 30 | 70 | 30 | 30 |
| | Anti-water adhesion (80° C. × 5 h) | Pass | Pass | Pass | Pass | Pass | Pass | Pass | Pass | Pass | Pass | Pass | Pass |
| | Anti-water adhesion after exposure to severe weather | Pass | Pass | Pass | Pass | Pass | Pass | Pass | Pass | Pass | Pass | Pass | Pass |
| | 60° gloss | 200 | 180 | 200 | 210 | 170 | 210 | 190 | 210 | 190 | 150 | 188 | 140 |
| | Visual feeling of metal | 5 | 4 | 5 | 5 | 4 | 5 | 4 | 5 | 4 | 2 | 3 | 3 |
| | Visual graininess | 4 | 3 | 4 | 4 | 4 | 4 | 4 | 4 | 4 | 1 | 3 | 3 |
| | Presence of sagging | None | None | None | None | None | None | None | None | None | None | Sagging | None |

4. Evaluation of Coating Film

The appearance and performance of the coating film of each test plate obtained in the above manner were evaluated. Table 4 shows the results.

evaluation was conducted on a five-grade scale by 2 designers and 3 engineers (total: 5 persons) who had been engaged in color development for 3 years or more, and the average value was employed.

5: Reflection of sunlight is very strong, and the blue sky is reflected on the coated plate. The flip-flop property is very high.
4: Reflection of sunlight is strong. The flip-flop property is very high.
3: Reflection of sunlight is strong. The flip-flop property is high.
2: Reflection of sunlight is weak. The flip-flop property is low.
1: Reflection of sunlight is weak. The FF property is very low.

Visual Graininess

The test plates obtained above were each observed outdoor on a fine day while changing the angle of the test plate against outdoor light, and the graininess was evaluated. A smaller graininess indicates that the coating film has excellent metal tone. The evaluation was conducted on a four-grade scale by 2 designers and 3 engineers (total: 5 persons) who had been engaged in color development for 3 years or more, and the average value was employed.
4: Graininess is very small.
3: Graininess is small.
2: Graininess is large.
1: Graininess is very large.

Presence of Sagging

The presence of sagging when each coating composition was applied to the vertical surface of the substrate 1 was determined. The finish is good when there is no sagging, and the finish is defective when there is sagging.

As shown in Table 4, the graininess and visual graininess of the coating film of Comparative Example 15 were inferior to those of the coating films of Examples 33 to 41. The visual feeling of metal and visual graininess of the coating films of Comparative Examples 16 and 17 were excellent, but were inferior to those of the coating films of Examples 33 to 41.

The embodiments and Examples of the present invention are described in detail above. However, the present invention is not limited to the above-mentioned embodiments, and various modifications can be made based on the technical idea of the present invention.

For example, the structures, methods, steps, shapes, materials, numerical values, etc., mentioned in the above embodiments and Examples are merely examples, and different structures, methods, steps, shapes, materials, numerical values, etc., may be used, if necessary.

Moreover, the structures, methods, steps, shapes, materials, numerical values, etc., of the above embodiments can be combined with each other within a scope that does not deviate from the gist of the present invention. Furthermore, the present invention can also employ the following structures.

Item 1. An effect pigment dispersion comprising water, a flake aluminum pigment, and a cellulose-based rheology control agent,
wherein the effect pigment dispersion contains 0.1 to 10 parts by mass of solids based on 100 parts by mass of all components thereof,
the viscosity measured using a Brookfield type viscometer is 400 to 10000 mPa·sec at a rotational speed of 6 revolutions per minute, and
the solids content of the flake aluminum pigment is 30 to 200 parts by mass based on 100 parts by mass of the total amount of components other than the flake aluminum pigment in the total solids content.

Item 2. The effect pigment dispersion according to Item 1, wherein a multilayer coating film obtained by applying the effect pigment dispersion to a dry film thickness of 0.1 to 3.0 μm to a colored coating film to form an effect coating film, and then further forming a clear coating film on the effect coating film has a 60-degree specular gloss of 110 to 250.

Item 3. The effect pigment dispersion according to Item 1, wherein a multilayer coating film obtained by applying the effect pigment dispersion to a dry film thickness of 0.1 to 0.3 μm to a colored coating film to form an effect coating film, and then further forming a clear coating film on the effect coating film has a 60-degree specular gloss of 150 to 240 and a graininess HG of 10 to 40.

Item 4. The effect pigment dispersion according to any one of Items 1 to 3, wherein the flake aluminum pigment has a thickness of 0.01 to 0.2 μm.

Item 5. The effect pigment dispersion according to any one of Items 1 to 4, wherein the cellulose-based rheology control agent contains cellulose nanofibers.

Item 6. The effect pigment dispersion according to Item 5, wherein the cellulose-based rheology control agent contains at least one neutralizer selected from the group consisting of quaternary ammonium salts, alkylamines, and alcohol amines.

Item 7. A method for forming a multilayer coating film, the method comprising:
applying a colored coating composition to a substrate to form a colored coating film,
applying the effect pigment dispersion according to any one of Items 1 to 6 to the formed colored coating film to form an effect coating film, and
applying a clear paint to the formed effect coating film to form a clear coating film.

Item 8. A multilayer coating film comprising:
a colored coating film formed from a colored coating composition,
an effect coating film formed from the effect pigment dispersion according to any one of Items 1 to 6 on the colored coating film, and
a clear coating film formed from a clear paint on the effect coating film.

Item 9. The multilayer coating film according to Item 8, wherein the effect coating film has a dry film thickness of 0.1 to 3.0 μm, and the multilayer coating film has a 60-degree specular gloss of 110 to 250.

Item 10. The multilayer coating film according to Item 8, wherein the effect coating film has a dry film thickness of 0.1 to 0.3 μm.

Item 11. The multilayer coating film according to any one of Items 8 to 10, wherein the multilayer coating film has a 60-degree specular gloss of 150 to 240 and a graininess HG of 10 to 40.

Item 12. The multilayer coating film according to any one of Items 8 to 10, wherein the flake aluminum pigment has a thickness of 0.01 to 0.2 μm.

INDUSTRIAL APPLICABILITY

The effect pigment dispersion and the method for forming a multilayer coating film of the present invention can be applied to various industrial products, particularly interior and exterior panels of automobile bodies, and automobile components.

The invention claimed is:
1. An effect pigment dispersion comprising water, a flake aluminum pigment, and a cellulose-based rheology control agent, the cellulose-based rheology control agent containing cellulose nanofibers, wherein the effect pigment dispersion contains 0.1 to 10 parts by mass of solids based on 100 parts by mass of all components thereof, the viscosity measured using a Brookfield type viscometer is 400 to 10000 mPa·sec at a rotational speed of 6 revolutions per minute, and the solids content of the flake aluminum pigment is 30 to 200 parts by mass based on 100 parts by mass of the total amount of components other than the flake aluminum pigment in the total solids content.

2. The effect pigment dispersion according to claim 1, wherein a multilayer coating film obtained by applying the effect pigment dispersion to a dry film thickness of 0.1 to 3.0 µm to a colored coating film to form an effect coating film, and then further forming a clear coating film on the effect coating film has a 60-degree specular gloss of 110 to 250.

3. The effect pigment dispersion according to claim 1, wherein a multilayer coating film obtained by applying the effect pigment dispersion to a dry film thickness of 0.1 to 0.3 µm to a colored coating film to form an effect coating film, and then further forming a clear coating film on the effect coating film has a 60-degree specular gloss of 150 to 240 and a graininess HG of 10 to 40.

4. The effect pigment dispersion according to claim 1, wherein the flake aluminum pigment has a thickness of 0.01 to 0.2 µm.

5. The effect pigment dispersion according to claim 1, wherein the cellulose-based rheology control agent contains at least one neutralizer selected from the group consisting of quaternary ammonium salts, alkylamines, and alcohol amines.

6. A method for forming a multilayer coating film, the method comprising:
   applying a colored coating composition to a substrate to form a colored coating film,
   applying the effect pigment dispersion according to claim 1 to the formed colored coating film to form an effect coating film, and
   applying a clear paint to the formed effect coating film to form a clear coating film.

7. A multilayer coating film comprising:
   a colored coating film formed from a colored coating composition,
   an effect coating film formed from the effect pigment dispersion according to claim 1 on the colored coating film, and
   a clear coating film formed from a clear paint on the effect coating film.

8. The multilayer coating film according to claim 7, wherein the effect coating film has a dry film thickness of 0.1 to 3.0 µm, and the multilayer coating film has a 60-degree specular gloss of 110 to 250.

9. The multilayer coating film according to claim 7, wherein the effect coating film has a dry film thickness of 0.1 to 0.3 µm.

10. The multilayer coating film according to claim 7, wherein the multilayer coating film has a 60-degree specular gloss of 150 to 240 and a graininess HG of 10 to 40.

11. The multilayer coating film according to claim 7, wherein the flake aluminum pigment has a thickness of 0.01 to 0.2 µm.

* * * * *